United States Patent [19]
Hosaka et al.

[11] Patent Number: 4,930,084
[45] Date of Patent: May 29, 1990

[54] VEHICLE CONTROL SYSTEM

[75] Inventors: Takefumi Hosaka; Yasuhisa Arai; Hiroki Matsui, all of Saitama, Japan

[73] Assignee: Honda Giken Kogyo Kabushiki Kaisha, Tokyo, Japan

[21] Appl. No.: 196,381

[22] Filed: May 19, 1988

[30] Foreign Application Priority Data

May 19, 1987 [JP] Japan ............................ 62-123061
May 19, 1987 [JP] Japan ............................ 62-123062

[51] Int. Cl.$^5$ ............................................ G06F 15/50
[52] U.S. Cl. ........................ 364/426.04; 364/424.01; 180/170
[58] Field of Search ............ 364/424.01, 426.04, 364/513; 180/170, 179; 123/350, 351

[56] References Cited

U.S. PATENT DOCUMENTS

| | | | |
|---|---|---|---|
| 4,638,445 | 1/1987 | Mattaboni | 364/513 |
| 4,648,044 | 3/1987 | Hardy et al. | 364/513 |
| 4,809,175 | 2/1989 | Hosaka et al. | 364/424.01 |
| 4,842,342 | 6/1989 | Takahashi et al. | 303/102 |

FOREIGN PATENT DOCUMENTS

| | | |
|---|---|---|
| 0205041 | 12/1986 | European Pat. Off. . |
| 0241286 | 10/1987 | European Pat. Off. . |
| 62-23805 | 7/1987 | Japan . |
| 3416812 | 11/1985 | Netherlands . |

OTHER PUBLICATIONS

Hartzband, "Enhancing Knowledge Representation in Engineering", Sep. 1985, IEEE Computer, p. 39–48.
Zadeh, "Fuzzy Logic," Apr. 1988, IEEE Computer, p. 83–93.
Faught, "Applications of AI in Engineering", Jul. 1986, IEEE Computer, pp. 17–27.
The Use of Expert Systems in Industrial Control (1985).
Artificial Intelligence in Process Control (1985).
Self-Turning Control: an Expert System Approach (1984).
Murofushi and Sugeno "Fuzzy control of Model Car", Journal of The Robotics Society of Japan, vol. 6, No. 6, Dec. 1988, pp. 536–541.

*Primary Examiner*—Thomas G. Black
*Attorney, Agent, or Firm*—Lyon & Lyon

[57] ABSTRACT

A vehicle control system embodied as an autocruise control. Fuzzy Logic is introduced in the system such that an expert driver's operation or judgment made on an non-automated vehicle is able to be incorporated in the system as fuzzy production rules. In the system, the control is effected in accordance with the rules which can be expressed linguistically in a simple manner and has a predictive nature therein. Operating condition of the vehicle is detected through parameters such as a vehicle speed, a vehicle acceleration and a change of vehicle acceleration which are then assigned on a scale named universe of discourse. The satisfaction degree is evaluated so that one rule is selected. A control value is determined from the selected rule which is output to an actuator to be controlled.

27 Claims, 22 Drawing Sheets

FIG. I

| $F_L$ | n | $V_{DIFF}$ $\alpha$ $\Delta\alpha$ $\mu$ | -7 -1.4 -2.8 -7 | -6 -1.2 -2.4 -6 | -5 -1.0 -2.0 -5 | -4 -0.8 -1.6 -4 | -3 -0.6 -1.2 -3 | -2 -0.4 -0.8 -2 | -1 -0.2 -0.4 -1 | 0 0 0 0 | 1 0.2 0.4 1 | 2 0.4 0.8 2 | 3 0.6 1.2 3 | 4 0.8 1.6 4 | 5 1.0 2.0 5 | 6 1.2 2.4 6 | 7 1.4 2.8 7 |
|---|---|---|---|---|---|---|---|---|---|---|---|---|---|---|---|---|---|
| NB | 1 | | 1.0 | 1.0 | 0.5 | 0 | 0 | 0 | 0 | 0 | 0 | 0 | 0 | 0 | 0 | 0 | 0 |
| NM | 2 | | 0 | 0 | 0.5 | 1.0 | 0.5 | 0 | 0 | 0 | 0 | 0 | 0 | 0 | 0 | 0 | 0 |
| NS | 3 | | 0 | 0 | 0 | 0 | 0.5 | 1.0 | 0.5 | 0 | 0 | 0 | 0 | 0 | 0 | 0 | 0 |
| ZO | 4 | | 0 | 0 | 0 | 0 | 0 | 0 | 0.5 | 1.0 | 0.5 | 0 | 0 | 0 | 0 | 0 | 0 |
| PS | 5 | | 0 | 0 | 0 | 0 | 0 | 0 | 0 | 0 | 0.5 | 1.0 | 0.5 | 0 | 0 | 0 | 0 |
| PM | 6 | | 0 | 0 | 0 | 0 | 0 | 0 | 0 | 0 | 0 | 0 | 0.5 | 1.0 | 0.5 | 0 | 0 |
| PB | 7 | | 0 | 0 | 0 | 0 | 0 | 0 | 0 | 0 | 0 | 0 | 0 | 0 | 0.5 | 1.0 | 1.0 |

| E | | u | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|---|---|
| EVA | $V_{DIF}$ | $\mu_{VA}$ | 0.05 | 0.1 | 0.2 | 0.3 | 0.4 | 0.7 | 1.0 | 1.0 | 1.0 | 0.7 | 0.4 | 0.3 | 0.2 | 0.1 | 0.05 |
| EFR | $\Delta\alpha$ | $\mu_{FR}$ | 0.0125 | 0.025 | 0.05 | 0.1 | 0.2 | 0.3 | 0.4 | 0.5 | 0.75 | 1.0 | 1.0 | 1.0 | 1.0 | 1.0 | 1.0 |
| ECF | $\Delta\alpha$ | $\mu_{CF}$ | 0.025 | 0.05 | 0.1 | 0.2 | 0.3 | 0.4 | 1.0 | 1.0 | 1.0 | 0.4 | 0.3 | 0.2 | 0.1 | 0.05 | 0.025 |
| EFE | $\alpha$ | $\mu_{FE}$ | 1.0 | 0.55 | 0.39 | 0.31 | 0.25 | 0.22 | 0.19 | 0.17 | 0.15 | 0.14 | 0.13 | 0.12 | 0.11 | 0.10 | 0.10 |
| ESF | $V_{DIF}$ | $\mu_{SF}$ | 0.2 | 0.3 | 0.4 | 0.5 | 0.75 | 1.0 | 1.0 | 1.0 | 1.0 | 1.0 | 0.75 | 0.5 | 0.4 | 0.3 | 0.2 |

FIG.12

| Ri | CONTENTS |
|---|---|
| 1 | Close the throttle valve slightly if the Speed Conformity and the Comfort will be satisfied after this has been done.<br>IF($\Delta\theta_{TH}$=NS→EVA IS GOOD AND $E_{CF}$ IS GOOD), THEN $\Delta\theta_{TH}$=NS |
| 2 | Do not change the throttle valve opening if the Speed Conformity will be satisfied when no change is made.<br>IF($\Delta\theta_{TH}$=ZO→EVA IS GOOD), THEN $\Delta\theta_{TH}$=ZO |
| 3 | Open the throttle valve slightly if the Speed Conformity, the Comfort, the Safety and the Fuel Efficiency will be satisfied after this has been done.<br>IF($\Delta\theta_{TH}$=PS→EVA IS GOOD AND $E_{CF}$ IS GOOD AND $E_{SF}$ IS GOOD AND $E_{FE}$ IS GOOD), THEN $\Delta\theta_{TH}$=PS |
| 4 | Close the throttle valve by a large amount if the Speed Conformity and the Comfort will be satisfied after this has been done.<br>IF($\Delta\theta_{TH}$=NB→EVA IS GOOD AND $E_{CF}$ IS GOOD), THEN $\Delta\theta_{TH}$=NB |
| 5 | Open the throttle valve by a large amount if the Speed Conformity, the Freshness and the Safety will be satisfied after this has been done.<br>IF($\Delta\theta_{TH}$=PB→EVA IS GOOD AND $E_{FR}$ IS GOOD AND $E_{SF}$ IS GOOD), THEN $\Delta\theta_{TH}$=PB |

FIG. 13

| $\theta_{TH}$ \ $V_{OFF}$ | | NB | NM | NS | ZO | PS | PM | PB |
|---|---|---|---|---|---|---|---|---|
| | n / m | 1 | 2 | 3 | 4 | 5 | 6 | 7 |
| NB | 1 | NB | NB | NB | NB | NM | NS | ZO |
| NM | 2 | NB | NB | NB | NM | NS | ZO | PS |
| NS | 3 | NB | NB | NM | NS | ZO | PS | PM |
| ZO | 4 | NB | NM | NS | ZO | PS | PM | PB |
| PS | 5 | NM | NS | ZO | PS | PM | PB | PB |
| PM | 6 | NS | ZO | PS | PM | PB | PB | PB |
| PB | 7 | ZO | PS | PM | PB | PB | PB | PB |

FIG. 14

| $\theta_{TH}$ \ $\alpha$ | | NB | NM | NS | ZO | PS | PM | PB |
|---|---|---|---|---|---|---|---|---|
| | n / m | 1 | 2 | 3 | 4 | 5 | 6 | 7 |
| NB | 1 | NB | NB | NB | NB | NM | NS | ZO |
| NM | 2 | NB | NB | NM | NM | NS | ZO | PS |
| NS | 3 | NB | NM | NM | NS | ZO | PS | PM |
| ZO | 4 | NB | NM | NS | ZO | PS | PM | PB |
| PS | 5 | NM | NS | ZO | PS | PM | PM | PB |
| PM | 6 | NS | ZO | PS | PM | PM | PB | PB |
| PB | 7 | ZO | PS | PM | PB | PB | PB | PB |

FIG. 15

| $\theta_{TH}$ \ $\Delta\alpha$ | | NB | NM | NS | ZO | PS | PM | PB |
|---|---|---|---|---|---|---|---|---|
| | n / m | 1 | 2 | 3 | 4 | 5 | 6 | 7 |
| NB | 1 | NB | NB | NB | NB | NM | NS | ZO |
| NM | 2 | NB | NB | NB | NM | NS | ZO | PS |
| NS | 3 | NB | NB | NM | NS | ZO | PS | PM |
| ZO | 4 | NB | NM | NS | ZO | PS | PM | PB |
| PS | 5 | NM | NS | ZO | PS | PM | PB | PB |
| PM | 6 | NS | ZO | PS | PM | PB | PB | PB |
| PB | 7 | ZO | PS | PM | PB | PB | PB | PB |

FIG. 16

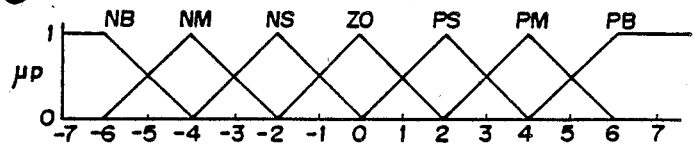

| Ri \ E | $E_{VA}$ | $E_{FR}$ | $E_{CF}$ | $E_{FE}$ | $E_{SF}$ |
|---|---|---|---|---|---|
| 1 | 0.8 | — | 0.7 | — | — |
| 2 | 1.0 | — | — | — | — |
| 3 | 0.82 | — | 0.75 | 0.15 | 1.0 |
| 4 | 0.25 | — | 0.2 | — | — |
| 5 | 0.25 | 1.0 | — | — | 0.4 |

| $U_{OUT}$ | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| $\theta_{TH}$ | -16 | -8 | -4 | -2 | -1 | -0.5 | -0.25 | 0 | 0.25 | 0.5 | 1 | 2 | 4 | 8 | 16 |

| | | | | | | | | | | | | | | | | |
|---|---|---|---|---|---|---|---|---|---|---|---|---|---|---|---|---|
| RiGi | NB | $V_{DIF}$ | -8.1 | -7.8 | -7.5 | -7.2 | -6.9 | -6.6 | -6.3 | -6 | -5.7 | -5.4 | -5.1 | -4.8 | -4.5 | -4.2 | -3.9 |
| | | $\alpha$ | -1.4 | -1.35 | -1.3 | -1.25 | -1.2 | -1.15 | -1.1 | -1.05 | -1.0 | -0.95 | -0.9 | -0.85 | -0.8 | -0.75 | -0.7 |
| | NM | $V_{DIF}$ | -6.1 | -5.8 | -5.5 | -5.2 | -4.9 | -4.6 | -4.3 | -4 | -3.7 | -3.4 | -3.1 | -2.8 | -2.5 | -2.2 | -1.9 |
| | | $\alpha$ | -1.05 | -1.0 | -0.95 | -0.9 | -0.85 | -0.8 | -0.75 | -0.7 | -0.65 | -0.6 | -0.55 | -0.5 | -0.45 | -0.4 | -0.35 |
| | NS | $V_{DIF}$ | -4.1 | -3.8 | -3.5 | -3.2 | -2.9 | -2.6 | -2.3 | -2 | -1.7 | -1.4 | -1.1 | -0.8 | -0.5 | -0.2 | -0.1 |
| | | $\alpha$ | -0.7 | -0.65 | -0.6 | -0.55 | -0.5 | -0.45 | -0.4 | -0.35 | -0.3 | -0.2 | -0.2 | -0.15 | -0.1 | -0.05 | 0 |
| | ZO | $V_{DIF}$ | -2.1 | -1.8 | -1.5 | -1.2 | -0.9 | -0.6 | -0.3 | 0 | 0.3 | 0.6 | 0.9 | 1.2 | 1.5 | 1.8 | 2.1 |
| | | $\alpha$ | -0.35 | -0.3 | -0.25 | -0.2 | -0.15 | -0.1 | -0.05 | 0 | 0.05 | 0.1 | 0.15 | 0.2 | 0.25 | 0.3 | 0.35 |
| | PS | $V_{DIF}$ | -0.1 | 0.2 | 0.5 | 0.8 | 1.1 | 1.4 | 1.7 | 2 | 2.3 | 2.6 | 2.9 | 3.2 | 3.5 | 3.8 | 4.1 |
| | | $\alpha$ | 0 | 0.05 | 0.1 | 0.15 | 0.2 | 0.25 | 0.3 | 0.35 | 0.4 | 0.45 | 0.5 | 0.55 | 0.6 | 0.65 | 0.7 |
| | PM | $V_{DIF}$ | 1.9 | 2.2 | 2.5 | 2.8 | 3.1 | 3.4 | 3.7 | 4 | 4.3 | 4.6 | 4.9 | 5.2 | 5.5 | 5.8 | 6.1 |
| | | $\alpha$ | 0.35 | 0.4 | 0.45 | 0.5 | 0.55 | 0.6 | 0.65 | 0.7 | 0.75 | 0.8 | 0.85 | 0.9 | 0.95 | 1.0 | 1.05 |
| | PB | $V_{DIF}$ | 3.9 | 4.2 | 4.5 | 4.8 | 5.1 | 5.4 | 5.7 | 6 | 6.3 | 6.6 | 6.9 | 7.2 | 7.5 | 7.8 | 8.1 |
| | | $\alpha$ | 0.7 | 0.75 | 0.8 | 0.85 | 0.9 | 0.95 | 1.0 | 1.05 | 1.1 | 1.15 | 1.2 | 1.2 | 1.3 | 1.35 | 1.4 |
| | | u | -7 | -6 | -5 | -4 | -3 | -2 | -1 | 0 | 1 | 2 | 3 | 4 | 5 | 6 | 7 |
| FL | NB | | 1.0 | 1.0 | 0.5 | 0 | 0 | 0 | 0 | 0 | 0 | 0 | 0 | 0 | 0 | 0 | 0 |
| | NM | | 0 | 0 | 0.5 | 1.0 | 0.5 | 0 | 0 | 0 | 0 | 0 | 0 | 0 | 0 | 0 | 0 |
| | NS | | 0 | 0 | 0 | 0 | 0.5 | 1.0 | 0.5 | 0 | 0 | 0 | 0 | 0 | 0 | 0 | 0 |
| | ZO | | 0 | 0 | 0 | 0 | 0 | 0 | 0.5 | 1.0 | 0.5 | 0 | 0 | 0 | 0 | 0 | 0 |
| | PS | | 0 | 0 | 0 | 0 | 0 | 0 | 0 | 0 | 0.5 | 1.0 | 0.5 | 0 | 0 | 0 | 0 |
| | PM | | 0 | 0 | 0 | 0 | 0 | 0 | 0 | 0 | 0 | 0 | 0.5 | 1.0 | 0.5 | 0 | 0 |
| | PB | | 0 | 0 | 0 | 0 | 0 | 0 | 0 | 0 | 0 | 0 | 0 | 0 | 0.5 | 1.0 | 1.0 |

FIG. 27

| $V_{DIF}$ FL \ $\alpha_{FL}$ m n | NB 1 | NM 2 | NS 3 | ZO 4 | PS 5 | PM 6 | PB 7 |
|---|---|---|---|---|---|---|---|
| NB 1 | | | | PB | PM | | |
| NM 2 | | | | PM | | | |
| NS 3 | | | | PS | ZO | | NM |
| ZO 4 | PB | PM | PS | ZO | NS | NM | NB |
| PS 5 | PM | | ZO | NS | | | |
| PM 6 | | | | NM | | | |
| PB 7 | | | NM | NB | | | |

FIG. 29

| FL | u / ρrα | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|---|
| NB | 1 | μOUT 1-7 | --- | --- | | | | | | | | | | | | μOUT 17 |
| NM | 2 | | | | | | | | | | | | | | | |
| NS | 3 | | | | | | | | | | | | | | | |
| ZO | 4 | | | | | | μOUTij | | | | | | | | | |
| PS | 5 | | | | | | | | | | | | | | | |
| PM | 6 | | | | | | | | | | | | | | | |
| PB | 7 | μOUT 7-7 | | | | | | | | | | | | | | μOUT 77 |

FIG. 30

| | Ri \ u | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|---|
| | NB | -4.9 | -4.8 | -4.7 | -4.6 | -4.5 | -4.4 | -4.3 | -4.2 | -4.1 | -4.0 | -3.9 | -3.8 | -3.7 | -3.6 | -3.5 |
| | NM | -3.5 | -3.4 | -3.3 | -3.2 | -3.1 | -3.0 | -2.9 | -2.8 | -2.7 | -2.6 | -2.5 | -2.4 | -2.3 | -2.2 | -2.1 |
| $\theta_{TH}$ | NS | -2.1 | -2.0 | -1.9 | -1.8 | -1.7 | -1.6 | -1.5 | -1.4 | -1.3 | -1.2 | -1.1 | -1.0 | -0.9 | -0.8 | -0.7 |
| (°) | ZO | -0.7 | -0.6 | -0.5 | -0.4 | -0.3 | -0.2 | -0.1 | 0 | 0.1 | 0.2 | 0.3 | 0.4 | 0.5 | 0.6 | 0.7 |
| | PS | 0.7 | 0.8 | 0.9 | 1.0 | 1.1 | 1.2 | 1.3 | 1.4 | 1.5 | 1.6 | 1.7 | 1.8 | 1.9 | 2.0 | 2.1 |
| | PM | 2.1 | 2.2 | 2.3 | 2.4 | 2.5 | 2.6 | 2.7 | 2.8 | 2.9 | 3.0 | 3.1 | 3.2 | 3.3 | 3.4 | 3.5 |
| | PB | 3.5 | 3.6 | 3.7 | 3.8 | 3.9 | 4.0 | 4.1 | 4.2 | 4.3 | 4.4 | 4.5 | 4.6 | 4.7 | 4.8 | 4.9 |

FIG. 32

| Ri | Contents |
|----|----------|
| 1 | If the Speed Conformity and the Comfort are satisfied when the throttle valve opening is changed −1 degree, then chang the throttle valve opening −1 degree.<br>IF(ΔθTH=−1°→EVA IS GOOD AND EcF IS GOOD), THEN ΔθTH=−1° |
| 2 | If the Speed Conformity is satisfied when the throttle valve opening is changed 0 degree, then change the throttle valve opening 0 degree.<br>IF(ΔθTH=0°→EVA IS GOOD), THEN ΔθTH=0° |
| 3 | If the Speed Conformity, the Comfort, the Safety and the Fuel Economy are satisfied when the throttle valve opening is changed +1 degree, then change the throttle valve opening +1 degree.<br>IF(ΔθTH=+1°→EVA IS GOOD AND EcF IS GOOD AND EsF IS GOOD AND EfE IS GOOD), THEN ΔθTH=+1° |
| 4 | If the Speed Conformity and the Comfort are satisfied when throttle valve opening is changed −10 degees;then change the throttle valve opening −10 degrees.<br>IF(ΔθTH=−10°→EVA IS GOOD AND EcF IS GOOD), THEN ΔθTH=−10° |
| 5 | If the Speed Conformity, the Freshness and the Safety are satisfied when the throttle valve opening is changed +10 degrees;then change the throttle valve opening +10 degrees,<br>IF(ΔθTH=+10°→EVA IS GOOD AND EFR IS GOOD AND EsF IS GOOD), THEN ΔθTH=+10° |

4,930,084

VEHICLE CONTROL SYSTEM

BACKGROUND OF THE INVENTION

1. Field of the Invention

This invention relates to a vehicle control system and more particularly to a vehicle control system which opens the way to the incorporation in the control of such non-physical factors as human judgments and impressions.

2. Description of the Prior Art

Vehicle devices and mechanisms that formerly were operated manually by the vehicle driver are, more and more, being controlled automatically. An example of such automation can be seen for instance, in the technology described in Japanese Patent Publication No. 59(1984)-9740, which discloses an autocruise control system.

Such conventional automatic control has employed various techniques including proportional control, proportional-plus-integral control and proportional-plus-integral-plus-differential control. In all cases, however, the control techniques have been premised on receiving physical quantities as input values. The physical quantities are represented numerically and input to the control system as parameters indicating states of vehicle operation, whereafter control values are computed in accordance with an appropriate manner. In this kind of control, however, it is impossible to include among the control factors things that are difficult to express clearly as physical quantities, such as the feelings and judgments of a human being. Thus the conventional control systems are unable to incorporate into the automatic control the manual driving techniques which a skilled driver uses on a non-automated vehicle to realize safety and economy as well as riding comfort and enjoyment. One of the reasons for this is that, as stated above, the feelings, judgments, impressions and the like of the skilled driver cannot be expressed as physical quantities and thus cannot be used as control factors in the systems. Such a skilled driver operates an accelerator pedal and a shift lever or the like during driving of his vehicle while making judgments with regard to the constantly changing surrounding circumstances, and in the process of doing this makes predictions regarding circumstances apt to arise in the future. With the conventional control systems, however, there is no hope of being able to incorporate such predictive judgments into the automatic control.

For the same reason, the conventional control techniques are unable to respond to the difference or diversity in feelings among individual drivers. As a result, it has not been possible to adequately give each individual driver a feeling of oneness with the vehicle, i.e. to give him the feeling that the vehicle is an extension of himself. Moreover, in the conventional control system, the control technique have become increasingly complicated and detailed year after year. Thus, when a microcomputer is used in the system, it is disadvantageously necessary to employ a memory of large capacity.

SUMMARY OF THE INVENTION

It is therefore an object of the invention to provide a vehicle control system which overcomes the drawbacks of the prior art.

Another object of the invention is to provide a vehicle control system which opens the way to higher precision control techniques by incorporating in the control not only human feelings, judgments and other factors which cannot be easily expressed as physical quantities, but also the predictive judgments of an expert driver made during manual operation on a non-automated vehicle.

Still another object of the invention is to provide a vehicle control system which, by opening the way to the possibility of reflecting the difference and diversity in the feelings of individual drivers without need to make changes in control principles, makes it possible to enhance the feeling of each individual driver that the vehicle is an extension of himself.

A further object of the invention is to provide a vehicle control system which, by enabling fine control to be expressed by simple control principles, makes it possible to minimize the memory capacity required when carrying out the control using a microcomputer For realizing the aforesaid objects, the invention provides a vehicle control system comprising first means for detecting operating condition of the vehicle through a parameter, second means for establishing rules using said parameter on the basis of an expert driver's manual operation and judgment effected on an non-automated vehicle, third means for evaluating the satisfaction degree of the rules through said parameter and selecting one rule. The system includes control means for determining a control value in accordance with the selected rule and fourth means is provided for driving an actuator in order to effect the required vehicle operation.

BRIEF DESCRIPTION OF THE DRAWINGS

These and other objects and advantages of the invention will be more apparent from the following description and drawings, in which:

FIG. 12 shows fuzzy production rules prepared in the procedures in the flowchart of FIG. 6;

FIG. 13 is a first prediction table prepared in the procedures in the flowchart of FIG. 6;

FIG. 14 is a second prediction table prepared in the procedures in the flowchart of FIG. 6;

FIG. 15 is a third prediction table prepared in the procedures in the flowchart of FIG. 6;

FIG. 16 is an explanatory graph of fuzzy labels used in the prediction tables shown in FIGS. 13 to 15;

FIG. 27 is a rule table used in the flowchart of FIG. 26;

FIG. 29 is a computation table used in the calculation according to the flowchart of FIG. 26;

FIG. 30 is a conversion table for converting the result of the second fuzzy reasoning into a real number according to the flowchart of in FIG. 26;

FIG. 32 shows fuzzy production rules used in the calculation in the flowchart of FIG. 31;

GENERAL SYSTEM DESCRIPTION

Figure 1:
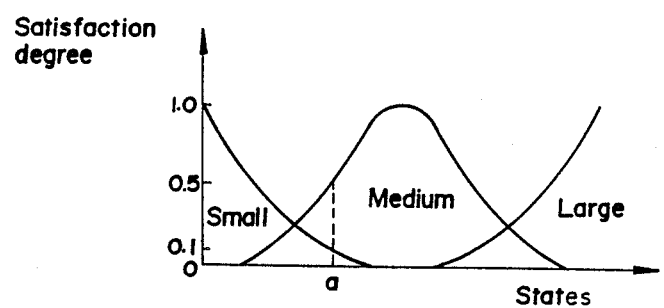
FIG. 1 is an explanatory graph illustrating theoretical premises of Fuzzy Logic applied in a vehicle control system according to the invention.

An explanation will first be given regarding the premises on which the invention is based. Usually states or conditions are represented in terms of physical values. However, it is also possible to represent states mathematically in terms of groups or sets, as is illustrated in FIG. 1. For example, a given phenomenon may be perceived as divided into the three states or subsets of small, medium and large. In this case, if one subset is indisputably satisfied, its degree of satisfaction can be defined as "1.0" whereas if it indisputable fails to be satisfied, its degree of satisfaction can be defined as "0". It is also possible to define intermediate degrees of satisfaction as "0.5, 0.7 . . ." Thus, as shown in the figure, a specific state a can, for instance, be said to have a degree of satisfaction in the "medium" subset of 0.5 but a degree of satisfaction in the "small" subset of only 0.1. This type of thinking falls within the scope of Fuzzy Logic and can be applied not only to objective physical phenomena but also to subjective non-physical phenomena such as feelings and impressions of a human being. Thus when applied to a system for vehicle operation, for example, Fuzzy Logic is not only capable of handling conventional physical quantities but also makes it possible, through psychological and statistical analysis, to introduce as factors indicating operating conditions such non-physical, subjective feelings and impressions as "drivability" or "steering response," and thus opens the way to the use of such impressions and feelings in the control of vehicle operation. The present invention relates to a vehicle control system which utilizes such a Fuzzy Logic or Approximate Reasoning.

Figure 2:
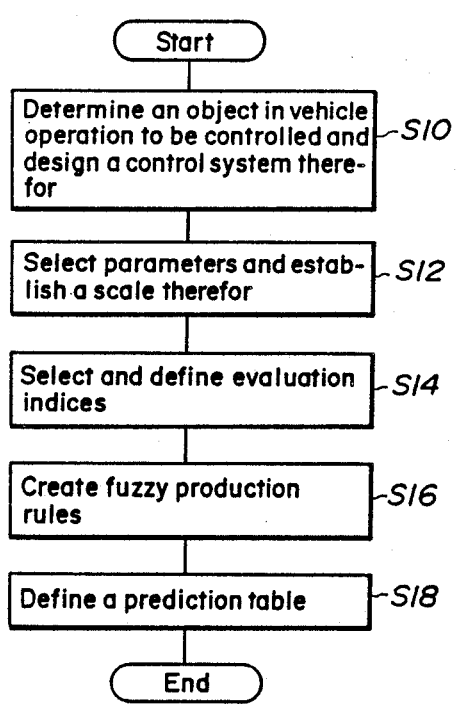
FIG. 2 is a flowchart showing preparatory procedures at designing vehicle control system according to the invention which enables to apply the Fuzzy Logic in the system.
Figure 3:
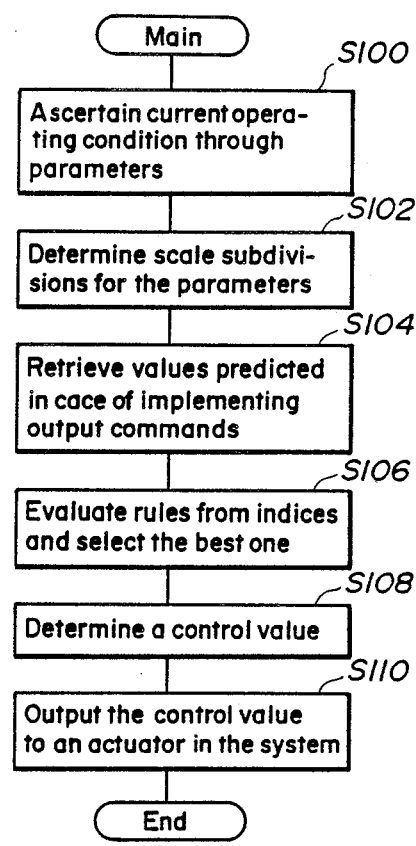
FIG. 3 is a flowchart illustrating routine procedures to be prosecuted at an actual operation according to the designed vehicle control system.

Before going into structural details of a system embodying the present invention, there follows a short discussion with reference to the flowcharts of FIGS. 2 and 3 for further elucidating a vehicle control system according to the invention.

FIG. 2 shows a preparatory routine carried out at designing a control system for vehicle operation. The preparatory routine begins with step 10 in which an object in the vehicle operation to be controlled such an example as is an autocruise control or an automatic transmission control is determined and a system therefor is designed utilizing the Fuzzy Logic therein. Then in step 12 parameters required for detecting the operating condition of the vehicle are selected in accordance with the purpose of the control object to be controlled and a scale divided into a prescribed number of subdivisions in accordance with the operating condition of the vehicle is established for each selected parameter. While these parameters are generally physical quantities, it is also possible to include human judgments, feelings and other non-physical factors after these have been quantified using appropriate techniques. In the case of a physical value, there is used either the actually measured value or a computed value obtained, for example, by second-order differentiation of the measured value.

In the following step S14, evaluation indices are selected and defined. The evaluation indices are determined based on the aforesaid parameters and, as will be explained later, are used as indices for evaluation of fuzzy production rules.

Next, the fuzzy production rules are created in step S16. The rules are linguistically expressed and one feature of the rules used here is that they are of a predictive nature, looking ahead to the degree of satisfaction of the aforesaid evaluation indices which would be obtained should the output commands prescribed thereby be effected.

In the following step S18, a prediction table is defined. The prediction table indicates changes in operating condition that would occur should the aforesaid output commands be effected and are expressed in terms of quantitative changes in the aforesaid parameters. The prediction table is determined in advance by experiment. The preparatory routine is completed by carrying out these steps S10 to S18.

FIG. 3 is a flowchart showing operation of the control system designed in accordance with the flowchart of FIG. 2. First, the current operating condition is ascertained in step S100. This is done using the aforesaid parameters.

Next, in step S102, the subdivision of the scale established in step S12 corresponding to the detected value of each parameter is determined.

The procedure then advances to step S104 where the vehicle operation predicted to occur should the output commands prescribed in the aforesaid rules be effected is conducted. This is done by retrieving predicted values from the table created in step S18.

Following this, the rules are evaluated for selection of the most appropriate one in step S106. This is done by judging the extent to which the retrieved predicted values meet the degrees of satisfaction required by the respective evaluation indices. Here it should be noted that when a plurality of evaluation indices apply to a single rule, the evaluation is made based on the smallest evaluation value. It should be noted also that when there are a plurality of rules, one of them is selected, this being done, for example, by selecting as the one with the highest degree of satisfaction, the one whose evaluation value is greatest.

The procedure then moves to step S108 where a control value is determined according to the output command included in the rule selected in the preceding step. The control value set in step S108 is then output to an actuator in the aforesaid system in step S110.

DESCRIPTION OF THE PREFERRED EMBODIMENT

Now, the vehicle control system according to the invention will now be explained taking an autocruise control system as an example.

Figure 4:
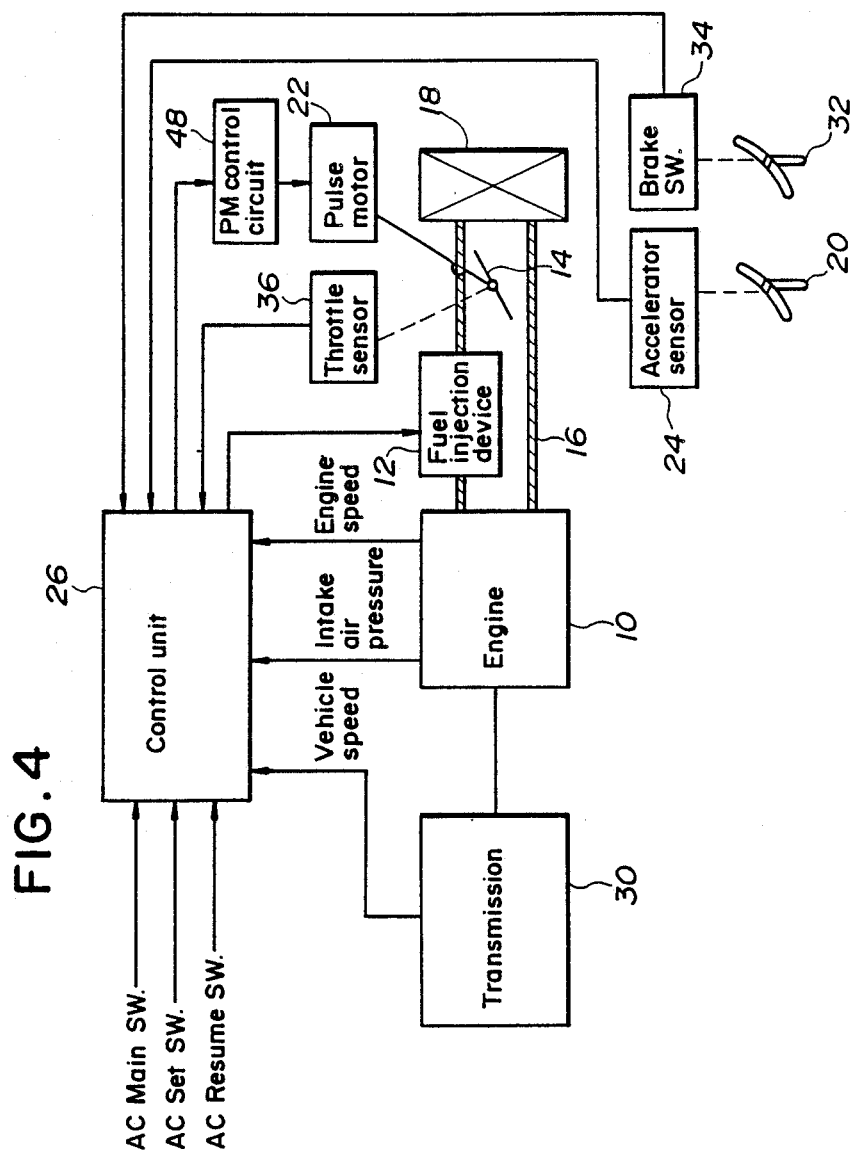
FIG. 4 is an overall schematic view of a vehicle control system embodied as an autocruise control system.

FIG. 4 is an overall schematic view of the system. In the figure, the reference numeral 10 denotes an engine which is supplied with fuel by a fuel injection device 12 located downstream a throttle valve 14 provided in an intake air passage 16 which has an air cleaner 18 at its upstream end. The throttle valve 14 is electrically, not mechanically, linked with an accelerator pedal 20 located on the floor of the vehicle at the operator's seat. The throttle valve is on the one hand connected to a pulse motor 22 by which it is driven to open and close. The accelerator pedal 20 has an accelerator sensor 24 for detecting the depressed degree of the pedal operated by the driver and for sending a signal in response to the detected value to a control unit 26. Further, a crankshaft angle sensor, not shown, is provided in the vicinity of a rotating member of the engine 10 and a pressure sensor, not shown, is provided downstream of the throttle valve 14 in the intake air passage 16. These sensors the engine crankshaft angle and the absolute pressure in the intake air passage and send signals representing the detected values to the control unit 26.

The stage following the engine 10 is a transmission 30 and a vehicle speed sensor ,not shown, located thereat detects the vehicle speed and sends a vehicle speed signal to the control unit 26. On the steering wheel ,not shown, there is further provided a main switch for issuing commands to start and stop the autocruise control, a set switch for issuing commands for setting a desired vehicle speed and for deceleration, and a resume switch for issuing commands for resuming autocruise control and for acceleration. The ON/OFF signals from these switches are similarly sent to the control unit 26. Further, a brake pedal 32 disposed at the side of the accelerator pedal 20 is provided with a brake switch 34 which sends a signal to the control unit 26 when the brake pedal 32 is depressed. Finally, a throttle sensor 36 is provided for detecting opening degree of the throttle valve 14 and sends a signal to the unit 26.

Figure 5:
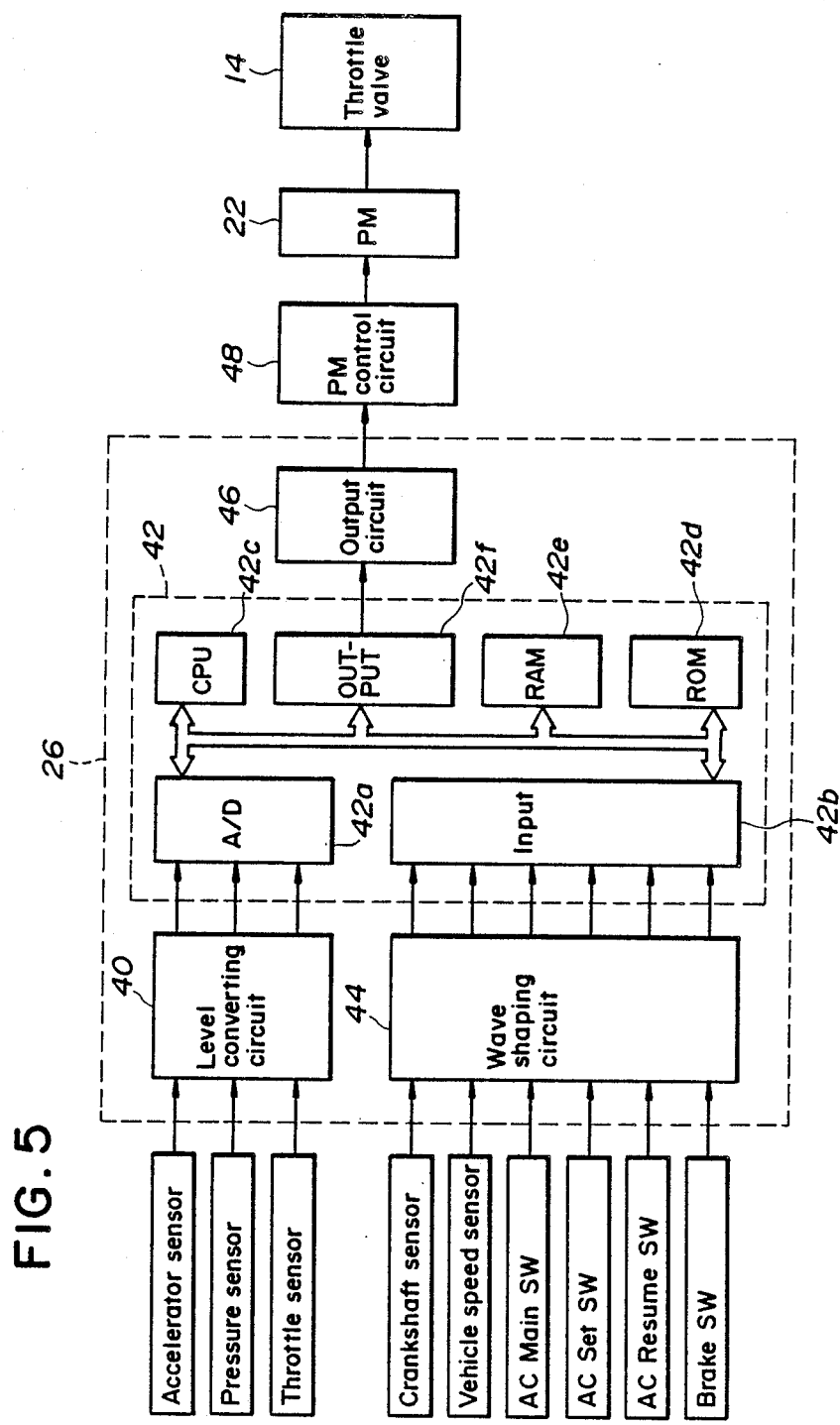
FIG. 5 is a block diagram of a control unit in the system of FIG. 4.

FIG. 5 shows the detailed structure of the control unit 26. As is illustrated, the output signal of the accelerator sensor etc. are first level-converted through a level converting circuit 40 in the unit and then sent to a microcomputer 42. The microcomputer 42 is provided with an A/D converter 42$a$, an input terminal board 42$b$, a CPU 42$c$, a ROM 42$d$, a RAM 42$e$ and an output terminal board 42$f$ and the output from the circuit 40 is A/D converted through the converter 42$a$ and is temporarily stored in the RAM 42$e$. Similarly, the output signals of the sensors including the crankshaft angle sensor are wave shaped through a wave shaping circuit 44 and forwarded in the microcomputer 42 through the input terminal board 42$b$. The microcomputer calculates a control value as described in detail at a later stage and issues a command through the output terminal board 42$f$ to the pulse motor control circuit 48 in order to actuate the pulse motor 22 which in turn drives the throttle valve 14 in the required direction.

Figure 6:
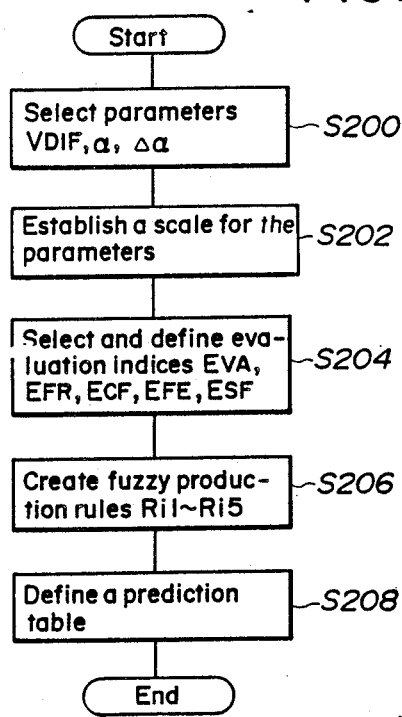
FIG. 6 is a flowchart similar to that of FIG. 2 and shows preparatory procedures at designing the autocruise control system illustrated in FIG. 4.

The operation of the the vehicle control system according to this invention will now be explained with reference to FIG. 6 and thereafter. FIG. 6 is similar to FIG. 2 and shows a preparatory routine for designing the autocruise control system shown in FIG. 4. In FIG. 6, the procedure begins with step S200 in which parameters indicating the operating condition are selected. As the parameters in this embodiment, there are selected the vehicle speed difference VDIF between the set vehicle speed VSET and the actual vehicle speed V (km/h—speed in kilometers per hour), vehicle acceleration $\alpha$ (km/h/s—change per second in vehicle speed per hour) and change in vehicle acceleration $\Delta\alpha$ obtained by secondorder differentiation of the vehicle speed (km/h/s/s—change in vehicle acceleration per second).

Figures 8, 9:
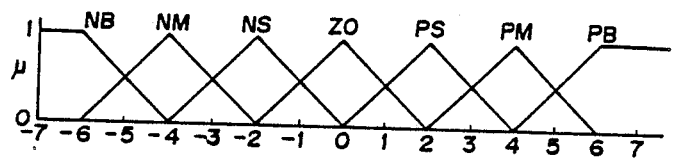
FIG. 8 is an explanatory view of a universe of discourse and membership map prepared at the procedures in the flowchart shown in FIG. 6 and stored in the control unit shown in FIG. 5.
FIG. 9 is an explanatory graph showing the relationship between the universe of discourse and fuzzy labels used in the membership map.

The procedure then advances to step S202 in which there is established a scale divided into a prescribed number of subdivisions in accordance with the operating condition of the vehicle. These subdivisions are shown in FIG. 8, from which it will be noted that the parameters VDIF, $\alpha$ and $\Delta\alpha$ are divided into 15 subdivisions assigned values centered on zero and ranging from +7 to −7 (this range of values being hereinafter referred to as the "universe of discourse u)." It should be noted that there is continuity between the subdivisions under the universe of discourse so that intermediate values can be computed by interpolation. As shown in the figure, the vehicle speed difference VDIF is correlated with the subdivisions of the universe under discourse over values ranging from not more than −7 km/h to not less than +7 km/h, the acceleration $\alpha$ is correlated with the same over values ranging from not more than −1.4 km/hr/s to not less than +1.4 km/h/s, and the change in acceleration $\Delta\alpha$ is correlated with the same over values ranging from not more than −2.8 km/h/s/s to not less than +2.8 km/h/s/s. Here a negative value of the vehicle speed difference VDIF indicates that the actual vehicle speed is lower than the set speed, while negative values of the acceleration $\alpha$ and the change in acceleration $\Delta\alpha$ indicate deceleration. The symbols in the column on the far left of the same figure are what are called "fuzzy labels FL" in Fuzzy Logic. As will be noted, seven labels are assigned, namely, NB, NM, NS, ZO, PS, PM and PB, and the cells at the intersections between these fuzzy labels and the the universe of discourse columns are assigned values between 0 and 1.0 (which will hereinafter be called "membership values $\mu$") The table of FIG. 8, hereinafter called a "membership map", is stored in the microcomputer of the control unit 26. The fuzzy labels are defined as follows: NB means Negative Big, NM means Negative Medium, NS means Negative Small, ZO means Zero, PS means Positive Small, PM means Positive Medium and PB means Positive Big. FIG. 9 shows the relationship between the fuzzy labels and the universe of discourse in the map in the form of a graph.

Figures 10, 11:
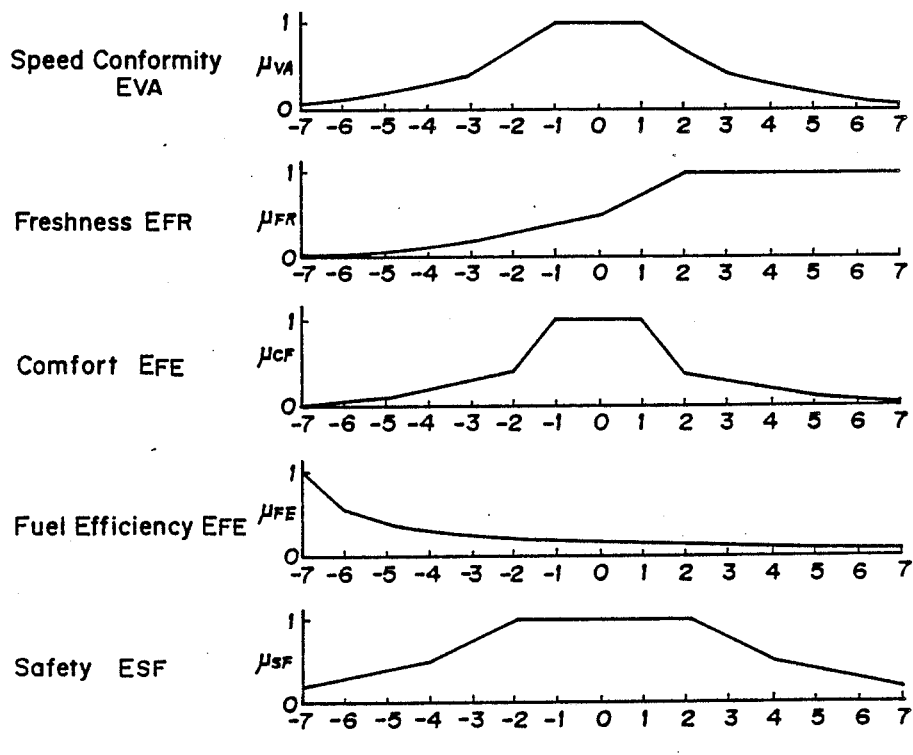
FIG. 10 is an explanatory view of a membership map for evaluation indices prepared in the flowchart of FIG. 6.
FIG. 11 is an explanatory graph of the evaluation indices of FIG. 10.

The procedure then advances to step S204 where vehicle performance evaluation indices E are selected, correlated with the subdivisions of the universe of discourse, tabulated in the form of a membership map, and stored in the ROM. The resulting membership map is shown in FIG. 10. Five evaluation indices are selected in the present embodiment of the invention: Speed Conformity index $E_{VA}$, Freshness index $E_{FR}$, Comfort index $E_{CF}$, Fuel Efficiency index $E_{FE}$, and Safety index $E_{SF}$. As can be seen in the drawings, like the membership map of FIG. 8, the membership map of FIG. 10 also has 15 subdivisions within the universe of discourse and membership values $\mu VA$, $\mu FR$, $\mu CF$, $\mu FE$ and $\mu SF$ are assigned to the cells at the intersections between the evaluation indices and the respective columns. Each evaluation index indicates the quality of an aspect of the vehicle performance at different states of the parameter concerned. More specifically, the Speed Conformity index $E_{VA}$ indicates the quality of the speed conformity as a value from 0 to 1.0 depending on the state of the vehicle speed difference VDIF. Similarly, the Freshness index $E_{FR}$ and the Comfort index $E_{CF}$ indicate the quality of the freshness and the comfort depending on the state of the change in acceleration $\Delta\alpha$, the Fuel Efficiency index $E_{FE}$ indicates the quality of the fuel efficiency depending on the state of the acceleration $\alpha$, and the Safety index $E_{SF}$ indicates the quality of the safety depending on the state of the speed difference VDIF. These relationships will be explained briefly with reference to FIG. 11 which shows them in graphic form. When the value of the speed difference VDIF is zero, this means that there is no difference between the set speed and the actual speed. Thus the membership value $\mu VA$ of the speed conformity index $E_{VA}$ is defined as the maximum value of 1.0 in the vicinity u=0 in the universe of discourse. It being known from experience that the passengers are given a fresh feeling when the change in acceleration is a small positive value, the membership value $\mu FR$ of the Freshness index $E_{FR}$ is defined by a curve sloping upward toward the right side of the universe. It having been confirmed from experience that the passengers are given a comfortable feeling when the acceleration $\Delta\alpha$ is constant, the membership value $\mu CF$ of the Comfort index $E_{CF}$ is defined as being maximum in the vicinity of u=0, where there is no change in acceleration. Since fuel economy is known to increase with increasing deceleration (negative acceleration), the membership value $\mu FE$ of the Fuel Efficiency index $E_{FE}$ is defined by a curve rising to the left. Since it has been confirmed by experience that safety increases with decreasing difference between set speed and the actual speed, because there is less likelihood of a change in vehicle speed when this difference is small, the membership value $\mu SF$ of the Safety index $E_{SF}$ is defined as being maximum in the vicinity of u=0. While the membership values $\mu E$ have been described as being determined experimentally and from experience, they can, needless to say, be alternatively defined by other manners. Moreover, it is alternatively possible to compute the lapse of time up to the inflection point at which the acceleration turns negative, and to use this lapsed time as the parameter on which the membership value of the Comfort index $E_{CF}$ is defined.

The procedure then moves to step S206 in which the fuzzy production rules Ri are created. Five rules Ri1--Ri5 are established as shown in FIG. 12. The rules are expressed linguistically (in words) and include a predictive aspect. For example, control rule Ri1 prescribes: "Close the throttle valve slightly if the Speed Conformity and the Comfort will be satisfied after this has been done." The other rules have similar predictive aspects. The rules prescribe an output command Ci, which in this embodiment is indicated by a fuzzy label FLCi. Further, while each control rule requires evaluation of one or more performance aspects, the matter of which performance aspects to include can be decided as desired based on the cause-and-effect relationship judged to exist with the object of the control. One criterion that can be considered for use in this selection is that if a given performance aspect need not be considered under the operating condition concerned, then it should not be included in the rule concerned. This is because requiring consideration to be given to a performance aspect that need not be considered may prevent consideration of other important performance aspects and possibly lead to the rule itself not being selected.

The procedure then advances to step S208 where a prediction table is defined. For this, the changes that would occur in the operating condition should the rules be applied one by one and their output commands implemented are defined in terms of the quantitative changes that would occur in the aforesaid parameters VDIF, $\alpha$ and $\Delta\alpha$ which will hereinafter be referred to as predicted values P (VDIFp, $\alpha$p and $\Delta\alpha$p), and the results are assigned the fuzzy label $FL_p$. FIGS. 13, 14 and 15 show tables illustrating the predicted values defined for the respective parameters in this way. The prediction tables are compiled in advance on the basis of experiments and are stored in the aforesaid ROM. FIG. 16 shows the fuzzy labels $FL_p$ used for these predicted values in the form of a graph.

Next, mode of operation of the autocruise control system shown in FIG. 4 will be explained hereinafter with reference to FIG. 7. In the first step S300 it is judged whether or not the aforesaid main switch is ON and if the judgment is NO, the autocruise control is not conducted (step S302).

When it is determined that the main switch is ON, the procedure moves to step 304 where the amount of throttle valve opening θTH is determined from the output of the throttle sensor 36 or accumulated values fed to the pulse motor 22, and the vehicle speed V, vehicle acceleration α and change in acceleration Δα are computed on the basis of the output of the vehicle speed sensor. More specifically, the vehicle speed V is computed on the basis of the average output value of the vehicle speed sensor over a prescribed time period, the acceleration α is computed by dividing the vehicle speed by time in seconds and the change in acceleration Δα is computed by dividing the acceleration α by time in seconds.

Next, in the step S306, it is determined whether or not the vehicle speed V computed in the preceding step is greater than a prescribed vehicle speed Vref, which may, for example, be 20 km/h, and when it is, the procedure moves to step S308 where it is determined whether or not the brake switch 34 is ON. In these steps, when it is found that the vehicle speed V is lower than the prescribed vehicle speed Vref or when it is found that the brake switch 34 is ON, autocruise control is not carried out (step S302).

In the following step S310 it is determined whether or not autocruise control is currently being conducted, and when it is not, the procedure moves to step S312 where it is determined whether or not a set flag is ON. If the set flag is ON, the procedure goes to step S314 where the vehicle speed V at that instant is read as the set vehicle speed VSET and in the ensuing step S316 the difference between the set vehicle speed VSET and the vehicle speed V detected in step S304 is computed as vehicle speed difference VDIF. Then in step S318 the amount of throttle valve opening θTH is set to a target value. What this amounts to is an initializing operation carried out prior to autocruise control for gradually opening the throttle valve to an amount corresponding to the set vehicle speed VSET. This is necessary because when the operator pushes the set switch and immediately takes his foot off the accelerator pedal, the throttle valve may open rapidly depending on the condition of the road on which the vehicle is traveling. The procedure then advances to step S320 where the shift to autocruise control is made. This will be explained with reference to the flowchart of FIG. 17 which shows a subroutine for autocruise control.

Figure 7:
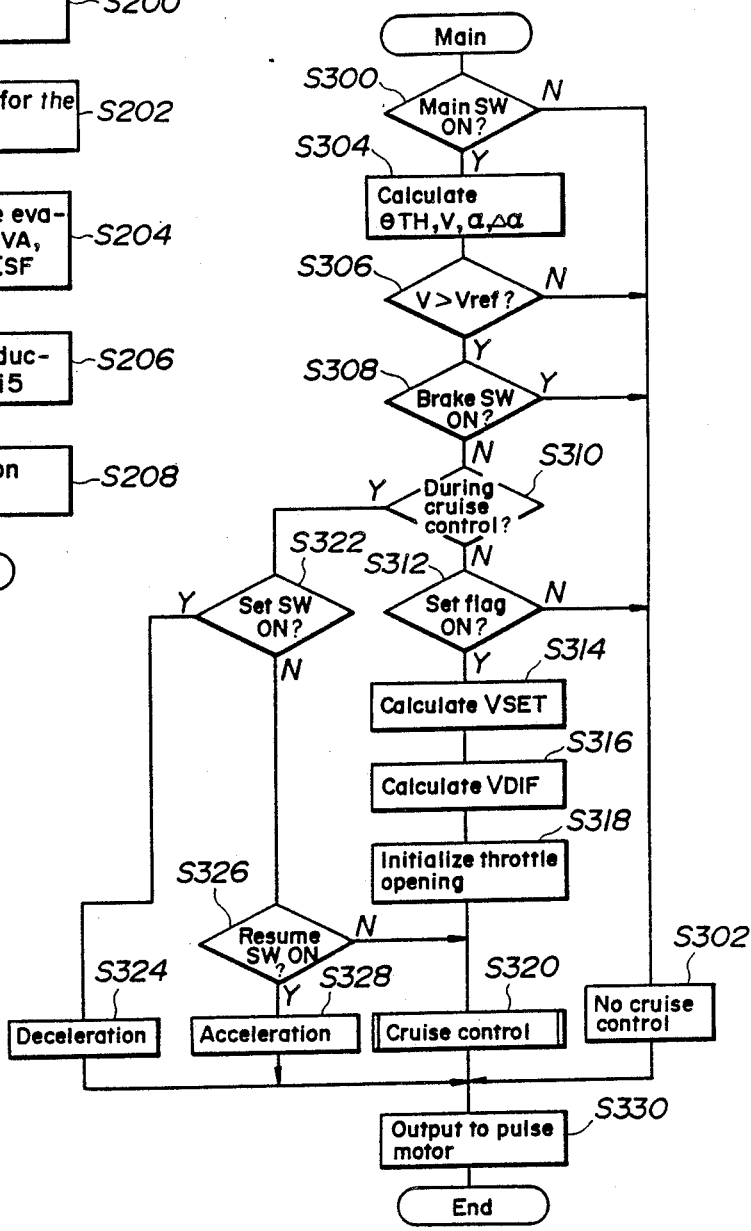
FIG. 7 is a flowchart similar to that of FIG. 3 and shows routine procedures to be prosecuted in operation of the system illustrated in FIG. 4.

However, regarding the main routine of FIG. 7, it should be noted that when it is determined in step S310 that autocruise control is currently in progress, the procedure moves to step S322 where it is determined whether or not the set switch is ON, and if it is, deceleration control is carried out (step S324). When it is determined in step S322 that the set switch is not ON, the procedure moves to step S326 where it is determined whether or not the resume switch is ON, and if it is, acceleration control is conducted (step S328), and if it is not, the control mode is shifted over to autocruise control. Further, when it is determined in step S312 that the set flag is not ON, autocruise control is not conducted (step S302). As the gist of the present invention resides in the autocruise control conducted mainly in the step S320, explanation of the main flowchart will be left at this.

Figure 17:
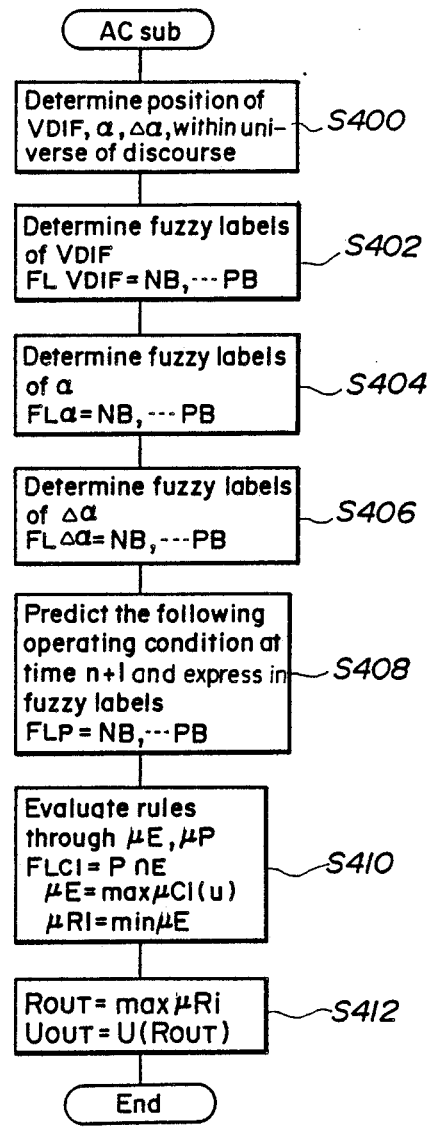
FIG. 17 is a flowchart showing a subroutine for autocruise control in the flowchart of FIG. 7.
Figure 18A:
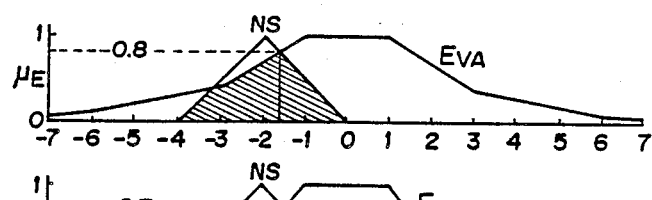
FIG. 18(a) to FIG. 18(g) are graphs showing examples of prediction of the following condition according to the procedures in the flowchart of FIG. 17.
Figure 18B:
Figure 18C:
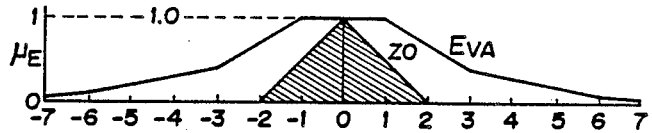
Figure 18D:
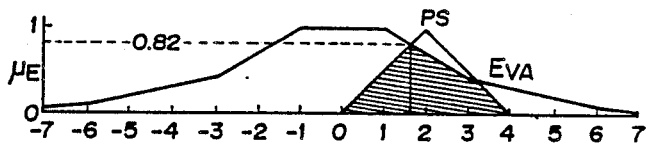
Figure 18E:
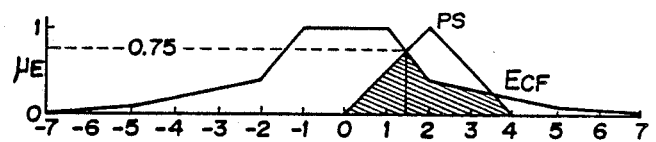
Figure 18F:
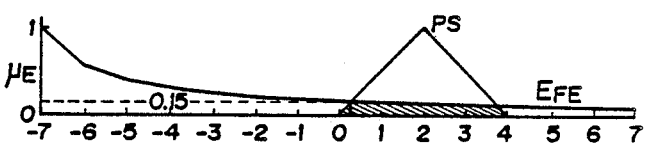
Figure 18G:
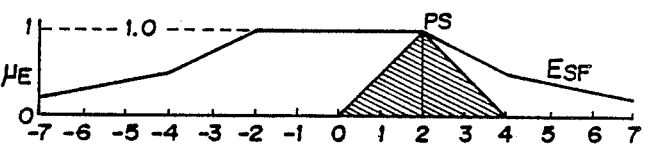

FIG. 17 is a flowchart showing the AC subroutine in step S320 in the aforesaid flowchart. The subroutine starts with step S400 in which the table of FIG. 8 is used for determining the position or value within the universe of the parameters computed in steps S304 and S316 in FIG. 7 flowchart and indicating the current operating condition, namely, speed difference VDIF, acceleration α and change in acceleration Δα. Then in steps S402, S404 and S406, the fuzzy labels FLVDIF, FLα and FLΔα corresponding to the respective parameters are determined.

Taking a concrete example, suppose that under the current operating condition vehicle speed difference VDIF=0 km/h, acceleration α=0 km/h/s and change in acceleration Δα=0 km/h/s/s. In this case, the value of
all the parameters within the universe would be u=0. Checking the u=0 column, it is found that the membership values corresponding to the fuzzy labels are 0, 0, 0, 1.0, 0, 0, 0. Thus the membership value of the fuzzy label ZO is 1.0, while that for all the other fuzzy labels is zero. Thus the only fuzzy label concerned is ZO. Therefore the results of the determination are:

| Parameter | Fuzzy label |
|---|---|
| Speed difference VDIF | ZO |
| Acceleration α | ZO |
| Change in acceleration Δα | ZO |

The procedure then advances to step S408 where, referring to the prediction tables of FIGS. 12 to 14, the fuzzy labels $FL_p$ indicating the predicted values P (VDIFp, αp and Δαp) of the parameters during the following operating condition (at a later time n+1) are computed from the aforesaid determined fuzzy labels FLVDIF, FLα and FLΔα and the fuzzy labels FLCi of the output commands Ci of the rules Ri1 to Ri5. By "following operating condition (at time n+1)" is meant the operating condition at a point in time which is later than the present point in time, and if the procedure of the flowchart of FIG. 7 is started once every prescribed time interval or once every prescribed advance in crankshaft angle, this expression can be defined to mean "at the start of the next cycle of the flowchart procedures." Alternatively, it may of course be defined as referring to the start of the cycle after next or to the start of some even later cycle.

In the aforesaid example, the predicted values become as follows:

| Rule | Output command | VDIFp | αp | Δαp |
|---|---|---|---|---|
| 1 | NS | NS | — | NS |
| 2 | ZO | ZO | — | — |
| 3 | PS | PS | PS | PS |
| 4 | NB | NB | — | NB |
| 5 | PB | PB | — | PB |

In the following step S410, the evaluation values μE of the respective rules are determined from the membership values (μVA, μFR, μCF, μFE, μSF) of the evaluation indices and the membership values mp of the fuzzy labels $FL_p$ of the predicted values. Thus in the case of the aforesaid example, since the evaluation indices of the first rule are the Speed Conformity index $E_{VA}$ (parameter VDIF) and the Comfort index $E_{CF}$ (parameter Δα) and the output command fuzzy label FLCi of control rule 1 is NS, the evaluation value μE of the Speed Conformity index $E_{VA}$ is 0.8, as shown in FIG. 18, namely the maximum value at the portion where the graph for the Speed Conformity index $E_{VA}$ and the fuzzy label NS of the speed difference VDIF overlap. Similarly, since the fuzzy label of the acceleration α is also NS, the evaluation value μE of the Comfort index $E_{CF}$ is 0.7. Further, since the only evaluation index of rule 2 is the Speed Conformity index $E_{VA}$ (parameter VDIF) and the fuzzy label of VDIF is ZO, the evaluation value μE is 1.0, as can be seen from FIG. 18(c). Since the evaluation indices of rule 3 are the Speed Conformity index $E_{VA}$, the Comfort index $E_{CF}$, the Fuel Efficiency index $E_{FE}$ and the Safety index $E_{SF}$, the evaluation values μE are, as shown respectively in FIGS. 18(d) to 18(g), 0.82, 0.75, 0.15 and 1.0. Similarly, in the case of rule 4, the evaluation values of the Speed Conformity index $E_{VA}$ and the Comfort index $E_{CF}$ are 0.25 and 0.2, respectively, and in the case of rule 5, the evaluation values of the Speed Conformity index $E_{VA}$, the Freshness index $E_{FR}$ and the Safety index $E_{SF}$ are 0.25, 1.0 and 0.4, respectively. The foregoing is summarized in FIG. 19. For conducting these computations, space is set aside in the RAM of the microcomputer 42 for a table like that of this figure. After the completion of each computation, resetting is carried out in an appropriate step (not shown) established for this purpose. If resetting to zero is done, however, at the time of the computation of the minimum values (which will be explained below) it becomes impossible to distinguish between an actual zero and an unused zero. Thus FF (overflow) resetting is used and the value which overflows is not considered in the determination of the minimum value.

Next the final evaluation values μRi of the rules are found. In this case, since the evaluation values (membership values μE) indicate the degree of satisfaction of the evaluation indices, there is taken as the evaluation value μRi in each case the minimum value among those for the respective evaluation indices, on the presumption that such minimum value "will satisfy all the evaluation indices at least within the range thereof." Thus the final evaluation values μRi are as follows:

| Rule | Minimum evaluation value |
|---|---|
| 1 | 0.7 |
| 2 | 1.0 |
| 3 | 0.15 |
| 4 | 0.2 |
| 5 | 0.25 |

Figures 19, 20, 21:
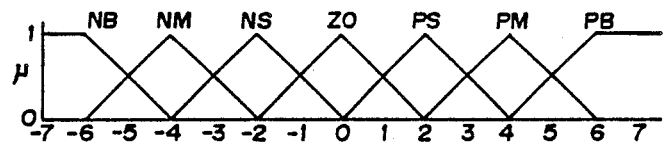
FIG. 19 is a table of the results of an example obtained by the determination according to the procedures in the flowchart of FIG. 17.
FIG. 20 is a table used in the flowchart of FIG. 17 for converting the control value of a selected rule into a real amount of throttle opening.
FIG. 21 is a graph showing the relationship between fuzzy labels and the universe of discourse used in the table shown in FIG. 20.

The procedure then advances to step S412 where one of the five rules is selected. At this time, the rule which gave the largest final evaluation value μRi in the preceding step is selected because a larger final evaluation value means a greater degree of satisfaction. Thus in the example, since rule 2 gives the largest value (1.0), this rule is selected as the applied rule Rout. The second control rule is: "Do not change the throttle valve opening if the Speed Conformity will be satisfied without doing so." Therefore, the output command U(Rout) of this selected rule becomes the control value Uout. A conversion table for Uout is shown in FIG. 20, wherein the upper row shows the control value Uout classified in a universe of discourse that is divided into 15 subdivisions, and the lower row defines corresponding amounts of opening degree θTH to which the throttle valve is to be controlled. In the case of the example, since the selected evaluation value μRi indicates a degree of satisfaction of 1.0 and since, in the case of the ZO fuzzy set, the Uout giving a value of 1.0 is u=0 as shown in FIG. 21, the amount of throttle valve opening θTH is 0 degrees. In the case where a plurality of output values are obtained at the time of conversion, the smallest one is selected from the viewpoint of precaution.

Another example will be explained. Assuming that under the current operating conditions speed difference VDIF=3 km/h, acceleration α=0.6 km/h/s, and change in acceleration Δα=1.2 km/h/s/s, the respective fuzzy labels will be found to be:

| Parameter | Fuzzy labels |
|---|---|
| Speed difference VDIF | PS, PM |
| Acceleration α | PS, PM |
| Change in acceleration Δα | PS, PM |

Moreover, the predicted values upon implementation of the respective rules will be as shown below. In this case, since the current operating condition involves a plurality of fuzzy labels, there will also be a plurality of fuzzy labels for the predictions

| Rule | Output command | VDIFp | αp | Δαp |
|---|---|---|---|---|
| 1 | NS | ZO, PS | — | ZO, PS |
| 2 | ZO | PS, PM | — | — |
| 3 | PS | PM, PB | PM, PM | PM, PB |
| 4 | NB | NM, NS | — | NM, NS |
| 5 | PB | PB, PB | — | PB, PB |

The predicted values for the respective control rules are thus

| Rule | $E_{VA}$ | $E_{FR}$ | $E_{CF}$ |
|---|---|---|---|
| 1 | 1.0, 0.8 | — | 1.0, 0.7 |
| 2 | 0.8, 0.4 | — | — |
| 3 | 0.4, 0.25 | — | 0.3, 0.2 |
| 4 | 0.4, 0.25 | — | 0.3, 0.2 |
| 5 | 0.25, 0.25 | 1.0, 1.0 | — |

| Rule | $E_{FE}$ | $E_{SF}$ |
|---|---|---|
| 1 | — | — |
| 2 | — | — |
| 3 | 0.15, 0.15 | 0.65, 0.4 |
| 4 | — | 0.65, 0.4 |
| 5 | — | 0.4, 0.4 |

While as in the preceding example the smallest values are taken as degrees of satisfaction for the respective rules, in this second example there are a plurality of evaluation values for each of the evaluation indices. Therefore, the largest value is first selected from among those for each of the evaluation indices in the sense that the prediction is more suited and the smallest values are selected thereafter. As a result, the smallest values will be:

| Rule | Smallest value |
|---|---|
| 1 | 1.0 |
| 2 | 0.8 |
| 3 | 0.15 |
| 4 | 0.3 |
| 5 | 0.25 |

Thus, rule 1 is selected, which prescribes: "Close the throttle valve slightly if the Speed Conformity and the Comfort will be satisfied after this has been done." In converting into an output value, NS becomes 1.0 when Uout=−2 as is shown in FIGS. 20 and 21 so that the throttle opening degree is determined to be −0.5 degree. Thus the throttle valve is closed by 0.5 degree.

Returning to the flowchart of FIG. 7, in step S330 the aforesaid control value is output to the pulse motor control circuit 48 to drive the pulse motor 22 for opening/closing the throttle valve 14 by the required amount. As explained in the foregoing, by the use of Fuzzy Logic, the invention opens the way to the incorporation of human feelings and impressions in the control. It also opens the way to enabling the predictive judgments of an experienced driver to be defined in the form of prediction tables and incorporated in the control. As a result it becomes possible for finer control to be carried out with high precision by means of simple rules, thus improving the driver's feeling that the vehicle is an extension of himself, while also opening the way to the realization of automatic control which simulates the safe, economical and comfort-producing driving techniques of a skilled driver effected on an nonautomated vehicle.

Figure 22:
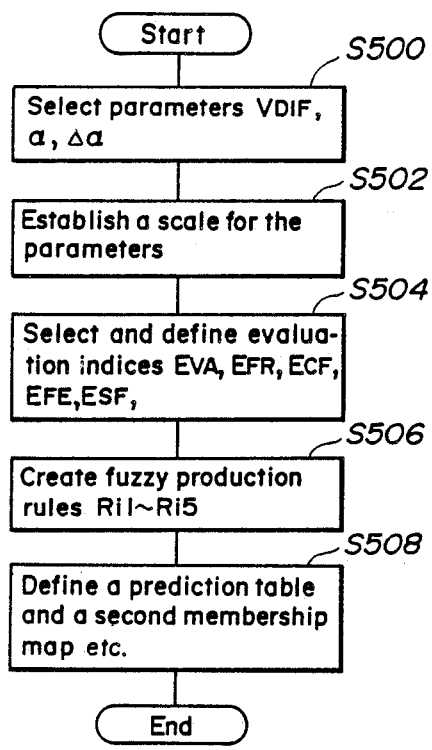
FIG. 22 is a flowchart similar to that of FIG. 6 but shows a second embodiment of the invention illustrating preparatory procedures for designing an autocruise control system similar to that shown in FIG. 4.
Figure 23:
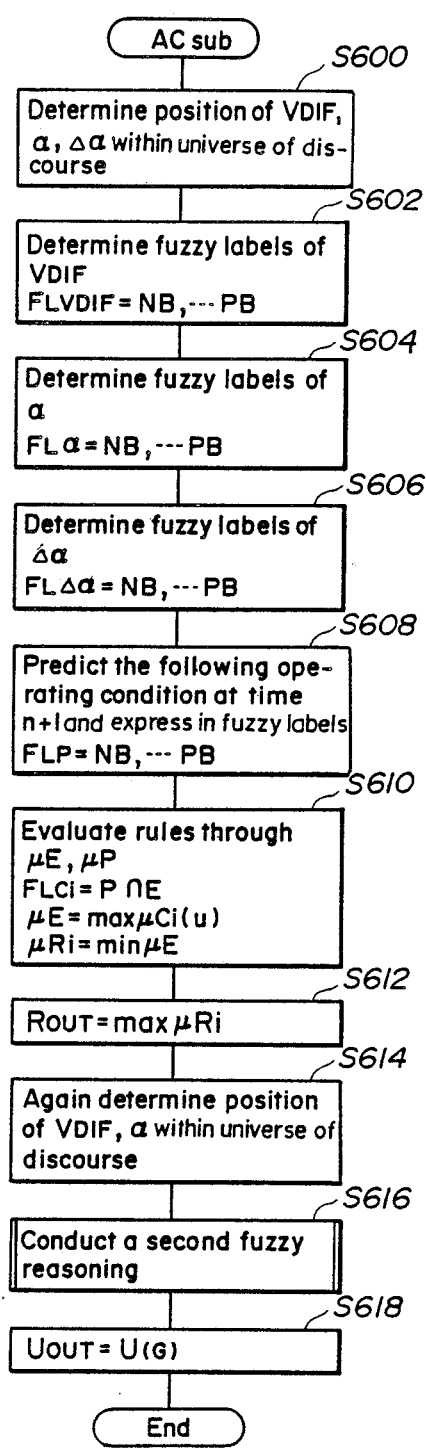
FIG. 23 is a flowchart similar to that shown in FIG. 17 and shows a subroutine for autocruise control according to the second embodiment of the invention.
Figures 24, 25:
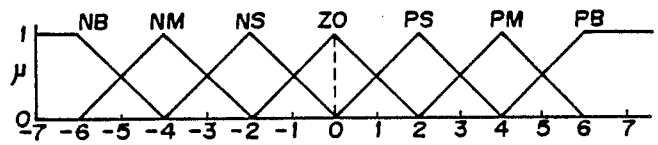
FIG. 24 shows a second membership map prepared at the procedures in the flowchart of FIG. 22.
FIG. 25 is a graph illustrating the relationship between the fuzzy labels and universe of discourse used in the map shown in FIG. 24.

A second embodiment of the invention is illustrated in FIGS. 22 to 30, which is also embodied as the autocruise control system shown in FIG. 4. The preparatory routine of the second embodiment is shown in FIG. 22. The steps S500 to S506 in the flowchart of FIG. 22 is nearly identical to those of steps s200 to s206 of FIG. 6, and differs therefrom only in the procedure at step S508. More specifically, as will be explained in greater detail later, in this second embodiment the procedure at step S508 determines the final control value by subjecting the output command of the selected rule to a second fuzzy reasoning or inference, and for the purpose of the step S508 there are defined and stored in the ROM a second parameter membership map, a second rule table and a second output conversion table, which will be explained later. Thus the procedure of the second embodiment is identical to that of the first up to the selection of the rule, but differs therefrom in how the output value is determined from the selected rule. This point will be explained with reference to FIG. 23, which is similar to that of FIG. 17 and shows another AC subroutine flowchart for autocruise control shown in FIG. 7. After the rule providing the highest degree of satisfaction has been selected in steps S600 to S612, the parameters determined in steps S304 and S316 in FIG. 7 flowchart as indicating the current operating condition are in step S614 once again determined with regard to their positions within the universe of discourse. The aforesaid second membership map used for this conversion is shown in FIG. 24. In this case since two types of parameters are sufficient, there are used the vehicle speed difference VDIF and the acceleration α. While the membership map of FIG. 24 is generally similar to that of FIG. 8, it differs in that the parameters are separately classified for each rule output command (fuzzy label FLCi). FIG. 25 represents the relationship between the fuzzy labels and the universe of discourse in graphic form. Thus in the conversion to values within the universe carried out in step S614, the output command fuzzy labels are selected in the preceding step, i.e. the subdivisions concerned with the universe are selected from the current operating condition. For instance, in the first example discussed earlier in which VDIF=0 km/h and α=0 km/h/s, since the selected rule was rule 2 whose command was ZO, the subdivision or the universe where VDIF=0 and α=0 in the ZO column at the upper portion in FIG. 24 is just above u=0 for both VDIF and α so that the subdivision selected would be u=0.

Next in step S616, the second fuzzy reasoning is carried out based on the results of the selection. This will be explained with reference to the flowchart of FIG. 26. What will be referred to here as the "second fuzzy reasoning" is similar to the fuzzy reasoning technique employed in the first embodiment and the preceding steps S600 to S612 in this embodiment but differs in that it does not include predictive nature.

For ease of understanding, the second reasoning will first be explained with respect to the earlier examples, in both of which the selected subdivision of the universe was u=0. As can be seen in FIG. 25, if a line is drawn vertically upward from the position of this zero, it will intersect only with the fuzzy label ZO. Next, with reference to the rule table of FIG. 27, the combination of fuzzy production rules prepared for the second reasoning involving the fuzzy label ZO of difference VDIF and the fuzzy label ZO of acceleration α is as shown below. When a rule of this table is expressed linguistically, it generally becomes such as "IF parameter a=x and parameter b=y, THEN control value=z." The control value is retrieved using the values of parameters VDIF and α as address data.

| IF | THEN |
|---|---|
| VDIF and α | θTH |
| ZO    ZO | ZO |

Figure 28:
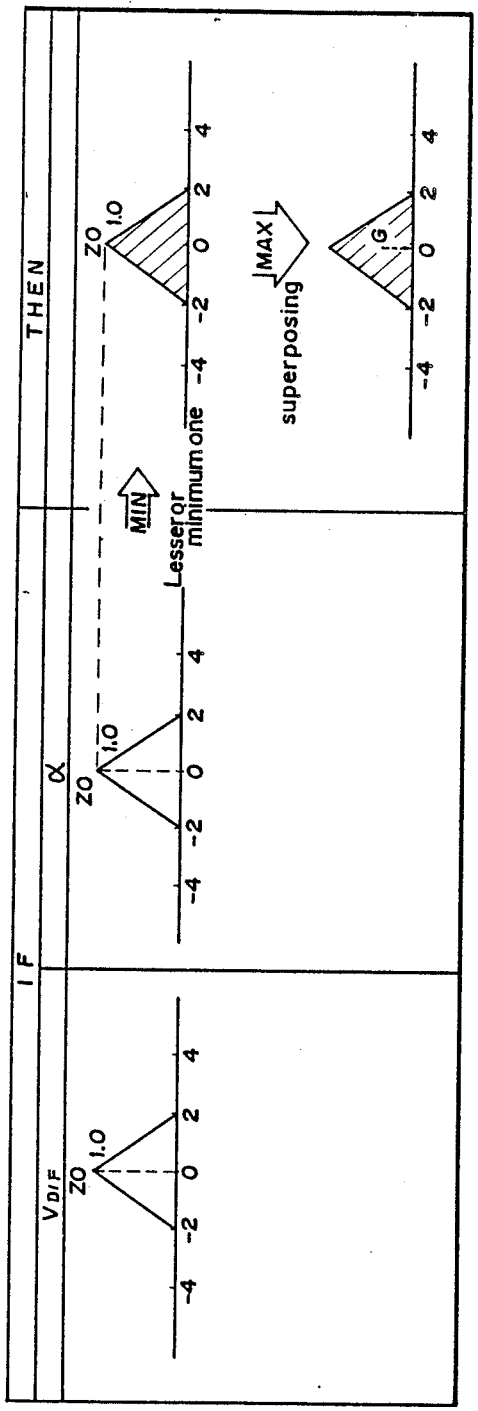
FIG. 28 is an explanatory view showing fuzzy relational composition carried out according to the second fuzzy reasoning referred in the flowchart of FIG. 26.

This means "If vehicle speed difference VDIF is zero and acceleration α is zero, then do not change the amount of throttle valve opening θTH." Then, as shown in FIG. 28, all fuzzy labels involved in the IF and THEN portions are extracted. In the case under discussion, therefore, three fuzzy labels are extracted: VDIF=ZO, α=ZO and θ TH=Z0. The triangular representations of the two fuzzy labels of the IF portion are compared, a minimum value is selected and the minimum value is used for truncating the triangular representation of the THEN portion. In the example, in FIG. 28 if in the fuzzy label ZO of the vehicle speed difference VDIF a line is drawn vertically upward from the position 1.0 on the universe, it will intersect the triangular representation at the membership value μ of 1.0. The membership value μ for the acceleration α is also 1.0. These values are compared and the smaller i.e. 1.0, is then selected and used as the height at which to laterally truncate the triangular representation of the fuzzy label ZO of the THEN portion. In the example, since the truncation is carried out at the height of 1.0, the triangular representation of the THEN portion is not actually cut. Then the remaining base portion, hatched portion, obtained in this way from the triangular representation of ZO is superposed on the universe u. Normally about 4 triangular representation will be involved but since in the example there is only one triangular representation in the THEN portion, the result of the composite superposing is identical with the original triangular representation. The desired control value is within the so-obtained composite hatched portion. In order to obtain a specific numerical value, the center of gravity G of the composite hatched portion is determined and a line is drawn vertically downward therefrom. The value at the point where this vertical line intersects the universe u is taken as the control value, which in this example is zero.

Figure 26:
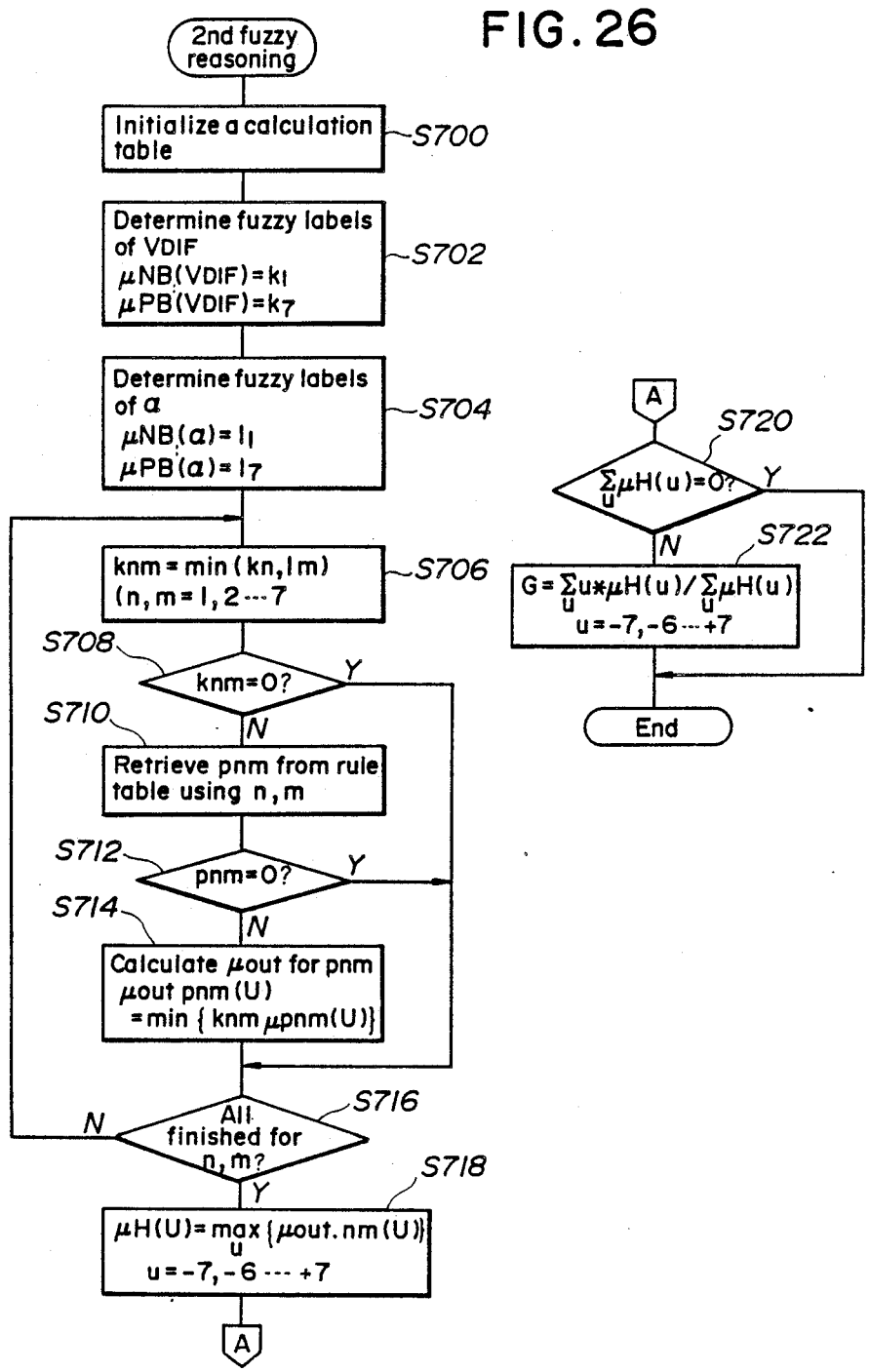
FIG. 26 is a flowchart showing a subroutine for the second fuzzy reasoning referred in the flowchart of FIG. 23.

This second fuzzy reasoning will now be explained with reference to the flowchart of FIG. 26. First, a computation table is initialized in step S700. This table is shown in FIG. 29 and is stored in the microcomputer 42. While computation values $\mu OUT_{ij}$, similar to the values referred to in the earlier example, are successively written into the central part of this table in a later step of the procedure, all that is done in this step is to secure space for computation of this table. The initial values are zero.

The procedure then advances to step S702 in which the membership values for all vehicle speed difference VDIF fuzzy labels from $\mu NB(VDIF) = k1$ to $\mu PB(VDIF) = k7$ are retrieved. Then similarly, in the following step S704, the membership values for all acceleration $\alpha$ fuzzy labels from $\mu B(\alpha) = 11$ to $\mu PB(\alpha) = 17$ are retrieved. In the foregoing example, this amounts to reading in the values 0, 0, 1.0, 0, 0, 0 in the column under the u=0 subdivision of the universe, which is the subdivision in which VDIF and $\alpha$ fall, and then writing these values into the aforesaid computation table. As was mentioned earlier, when no corresponding column exists, the value is determined by interpolation from the values of the two nearest columns.

The succeeding step S706, the retrieved values, $k_{nm} = MIN (k_n, 1_m)$ (fuzzy label numbers n, m = 1, 2 ... 7) are compared and the minimum value is selected. This corresponds to the comparison of the two ZO values 1.0 and 1.0 of the IF portion in the earlier example.

The procedure then advances to step S708 in which it is judged whether or not the result of the comparison is zero, and if it is not, the procedure moves to step S710 in which the fuzzy label numbers n, m are used to retrieve the fuzzy label $p_{nm}$ of the THEN portion from the rule table of FIG. 27. This corresponds to the operation in the earlier example of using VDIF and $\alpha$ for selecting the intersecting THEN portion fuzzy label ZO. The other rules in the rule table of FIG. 27 are listed below. Where a cell in the table is left empty, this indicates that no rule exists, and in actual practice a zero is inserted in the cell.

| IF | | THEN |
|---|---|---|
| VDIF and $\alpha$ | | $\Theta$TH |
| 1. NB | ZO | PB |

(If the actual vehicle speed is much smaller than the set vehicle speed and the acceleration is zero, then open the throttle valve by a great amount.)

| 2. NB | PS | PM |

(If the actual vehicle speed is much smaller than the set vehicle speed and the vehicle is accelerating slightly, then open the throttle valve by a moderate amount.)

| 3. NM | ZO | PM |

(If the actual vehicle speed is moderately smaller than the set vehicle speed and the vehicle acceleration is zero, then open the throttle valve by a moderate amount.)

.
.
.

The procedure then advances to step S712 in which it is judged whether or not the fuzzy label $p_{nm}$ of the THEN portion is "0," that is, whether or not there is a THEN portion. If it is not zero, the procedure advances to step S714 in which $\mu$out for $p_{nm}$ is computed. This corresponds to the operation previously explained with reference to FIG. 28 of truncating the triangular representation of the THEN portion based on the smallest value among the triangular representations in the IF portion. This operation is repeated for every rule (step S716). In the example, since the selected subdivision of the universe was u=0, the IF portion involved only one rule. Ordinarily, however, there will be about four triangular representations involved and the foregoing procedures have to be carried out for all. Incidentally, In step S708, since the rule has no IF portion in the case where the minimum value of $k_{nm}$ is zero, in such a case the computation is discontinued and the procedure jumps directly to step S716. In step S712, on the other hand, the control rule has no THEN portion when $p_{nm}$ is zero and so in this case too the procedure jumps directly to step S716.

The procedure then advances to step S718 in which the computed values are summarized to calculate composite value $\mu H(u)$. This corresponds to the operation previously explained with reference to FIG. 28 of superposing on the universe. Then in step S720 in which it is judged whether or not the composite value is zero, and if it is not, the center of gravity G is derived in step S722 by weighted averaging or the like, whereafter the corresponding value on the universe is determined. When the composite value is found to be zero in step 720, this means that there is no THEN portion and the computation for finding the center of gravity is not carried out.

Returning to the flowchart of FIG. 23, following the fuzzy reasoning of step S616, the procedure moves to step S618 where the value on the universe is converted into a real number. This is done using the conversion table shown in FIG. 30. In this figure, the top row is divided into subdivisions of the universe, while the lower rows, one for each fuzzy label, are subdivided into amounts of throttle valve opening OTH. At the time of conversion, therefore, retrieval is conducted once again using the fuzzy label (output command) of the rule Ri selected in step S612. In the case of the example, since the fuzzy label of the output command was ZO, the value at u=0 in the ZO column is selected. Thus the value selected is 0. A separate conversion table is established for each rule.

The aforesaid value is output to the pulse motor control circuit 48 according to procedures in a flowchart, not shown, similar to that of FIG. 7, whereby, as in the first embodiment, the pulse motor 22 is driven to open/close the throttle valve 14 by the required amount. While in the embodiment just described fuzzy reasoning is used for determination of the output command following step S612 in FIG. 23 flowchart, this determination need not necessarily be conducted using the second fuzzy reasoning but can instead be conducted using the conventional proportional-plus-integral-plus-differential control technique.

Figures 31, 33:
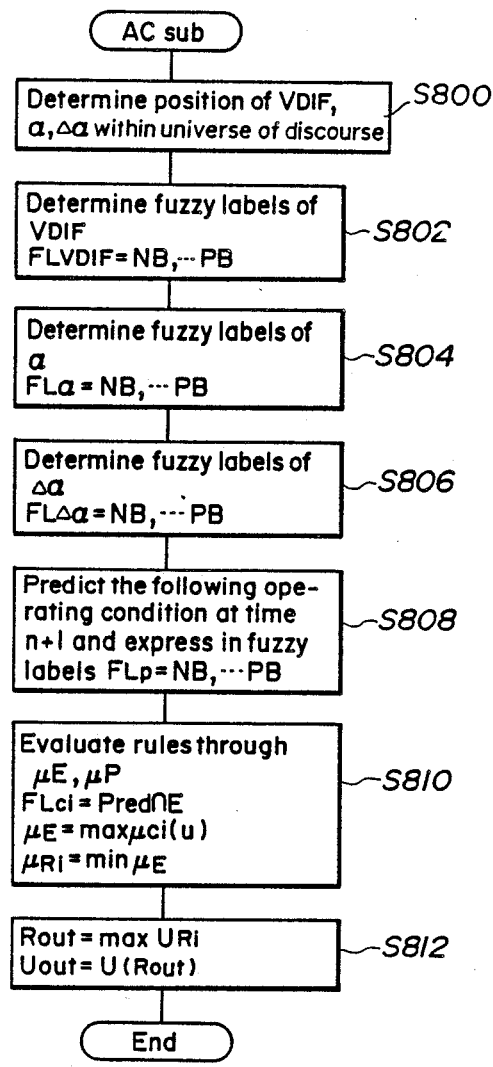
FIG. 31 is a flowchart similar to that of FIG. 23 but shows the third embodiment of the invention.
FIG. 33 is a conversion table for converting commands in the rules expressed in real numbers into fuzzy labels.

FIG. 31 is a flowchart showing the AC subroutine of a third embodiment of the present invention. As in the first embodiment, after the current operating condition has been ascertained in terms of fuzzy labels (steps S800–S806), predicted values $FL_p$ are retrieved in step S808 using a prediction table, not shown, similar to those illustrated in FIGS. 13 to 15. The difference between this embodiment and the first is that, as shown in FIG. 32, the rule output commands are expressed as real numbers rather than as fuzzy labels. Thus the retrieval of the prediction fuzzy labels $FL_p$ is conducted after these real numbers have been once converted to fuzzy labels using a conversion table shown in FIG. 33. Then, similarly to the first embodiment, the procedure advances to step S810 where the degree of satisfaction of the rules is evaluated and then to step S812 where the rule output command Rout with the largest value is selected as the control value Uout. In the present embodiment, however, since the output command is obtained as a real number, there is no need for the second conversion operation of the first embodiment. The remaining steps are the same as those of the first embodiment and produce the same effects.

Figure 34:
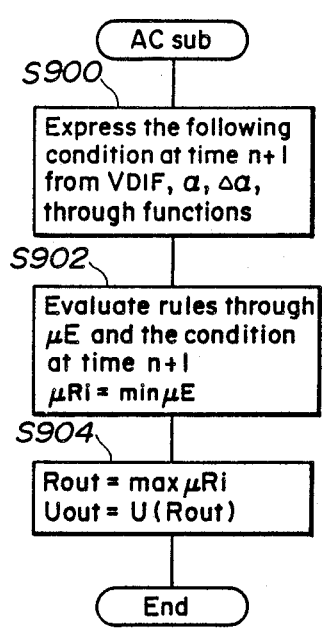
FIG. 34 is a flowchart similar to that shown in FIG. 31 but shows the fourth embodiment of the invention.
Figure 35A:
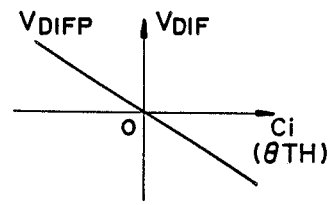
FIG. 35(a) to FIG. 35(c) are graphs for converting parameters into output command according to the procedures in the flowchart of FIG. 34.
Figure 35B:
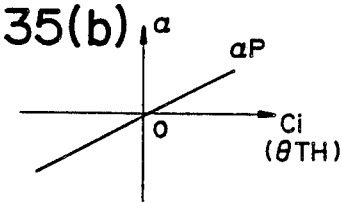
Figure 35C:
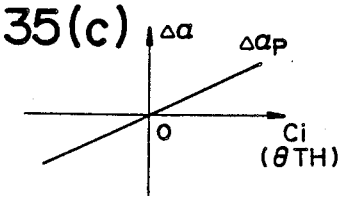

FIG. 34 is a flowchart showing the AC subroutine of a fourth embodiment of the present invention. This fourth embodiment is of a simpler arrangement than the preceding three embodiments. While like the third embodiment this fourth embodiment also uses rules based on real numbers, it does not employ membership maps for the parameters or predicted value tables but uses functions, as shown in FIGS. 35(a) to 35(c). In each of FIGS. 35(a), (b) and (c), the x-axis is graduated for the output command Ci i.e., the amount of throttle valve opening $\theta TH$ and the y-axis is graduated in real numbers for a parameter indicating the operating condition.

Figure 36:
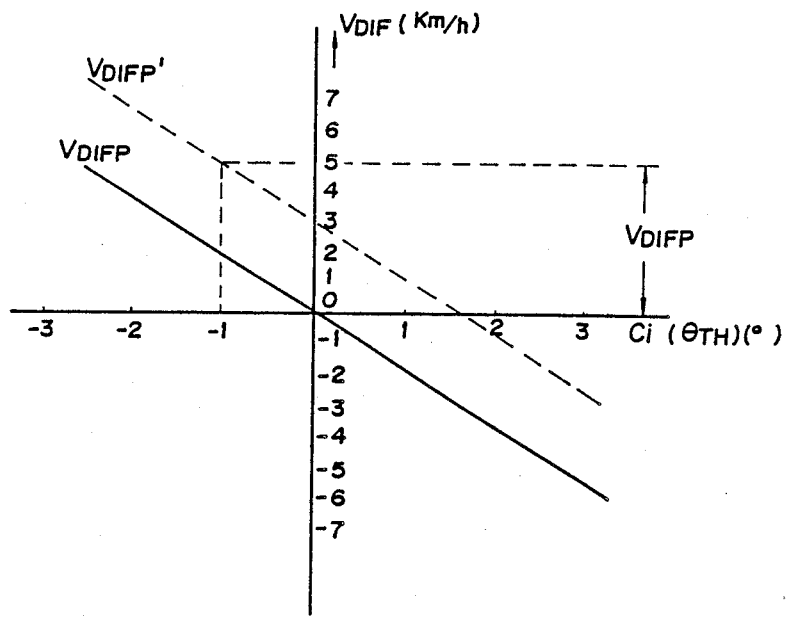
FIG. 36 is an explanatory graph illustrating an example of how the following operating condition is example of how the following operating condition is predicted according to the procedures in the flowchart of FIG. 34.

Referring to the flowchart of FIG. 34, in step S900 the parameters VDIF, $\alpha$ and $\Delta\alpha$ indicating the current operating condition are retrieved and predicted parameter values VDIFp, $\alpha p$ and $\Delta\alpha p$ are obtained from output commands Ci of rules similar to those of FIG. 32. Referring next to FIG. 36, if the current speed difference is presumed to be 3 km/h, then the straight line VDIFp is shifted in the positive direction by 3 km/h to obtain the straight line VDIFp'. The output command Ci of rule 1 being $\theta TH = -1$, the value of VDIF on the y-axis at the point where a line drawn vertically to the x-axis through $-1$ intersects the straight line VDIFp' is 5. It is thus found that the predicted value VDIFp = 5 km/h.

Figure 37:
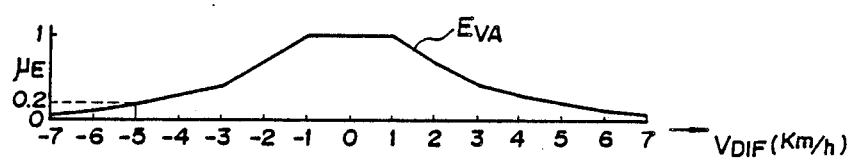
FIG. 37 is a graph illustrating the evaluation of the rules in the fourth embodiment of the invention

The procedure then advances to step S902 where an evaluation value is obtained for each rule. As shown in FIG. 37, in the case of the Speed Conformity index $E_{VA}$, a vertical line is drawn upward from the position of $-5$ km/h, the value obtained in the preceding step, in the Speed Conformity index $E_{VA}$ graph and the evaluation value $\mu E$ is the value of 0.2 at the point where this vertical line intersects the EVA curve. This same operation is conducted for all rules and, as in the preceding embodiments, the smallest value is determined. Then, in step S904, the rule giving the largest value is found and the output command U(Rout) of the rule is used as the control amount Uout. In this case, the output command is expressed as a real number so that, as in the third embodiment, there is no need for reconversion. It should be noted that a table may be used in place of the functions of FIGS. 35(a) to 35(c). This fourth embodiment has the advantage of being simpler in arrangement than the preceding three.

While the above description discloses preferred embodiments applied to the autocruise control, the invention will be further applied to other systems including an automatic transmission control.

What is claimed is:

1. A vehicle autocruise control system comprising:
    first means for detecting operating condition of the vehicle through a parameter, said parameter having been assigned a fuzzy set with a membership function;
    second means for carrying out fuzzy inference on the parameter and a plurality of fuzzy production rules which have been defined on the basis of an analysis of judgments and feelings of an expert driver of a vehicle without autocruise control system, each fuzzy production rule being based on the fuzzy set and including a control value, the second means selecting one of the fuzzy production rules through the fuzzy inference; and
    actuator means for changing a vehicle speed in accordance with the control value of the selected rule.

2. A system according to claim 1, wherein said parameter is an actually detected value.

3. A system according to claim 2, wherein said detected value is a vehicle speed.

4. A system according to claim 1, wherein said parameter is a value calculated from a value actually detected.

5. A system according to claim 4, wherein said value is a value calculated from the value actually detected through a computation selected from the group consisting of: n-th differentiation, difference, addition, subtraction, and proportional computation.

6. A system according to claim 5, wherein said calculated value is a vehicle acceleration.

7. A system according to claim 5, wherein said calculated value is a change of vehicle acceleration.

8. A system according to claim 5, wherein said calculated value is a time lapse up to the inflection point at which a vehicle acceleration turns negative.

9. A vehicle autocruise control system, comprising;
    first means for detecting operating condition of the vehicle including vehicle speed, said operating condition having been assigned a fuzzy set with a membership function;
    second means for carrying out fuzzy inference by applying the detected operating condition to the fuzzy set to determine a control value; and
    actuator means for changing the vehicle speed in response to the control value.

10. A system according to claim 9, wherein a plurality of fuzzy production rules have been defined on the basis of the fuzzy set and said second means carries out the fuzzy inference using said fuzzy production rules.

11. A vehicle autocruise control system, comprising;
    first means for detecting operating condition of the vehicle including vehicle speed, the detected operating condition having been assigned a fuzzy set with a membership function;
    second means for carrying out fuzzy inference by applying the detected operating condition to the fuzzy set to determine a control command, the second means determining a control value after predicting change in the vehicle operating condition which would occur if the vehicle speed be presumed to change in accordance with the control command; and
    actuator means for changing the vehicle speed in response to the determined control value.

12. A system according to claim 11, wherein said vehicle operating condition change has been assigned a fuzzy set with a membership function and said second means carries out the prediction by applying the detected operating condition to the fuzzy set.

13. A system according to claim 12, wherein a plurality of fuzzy production rules have been defined on the basis of the fuzzy set which are made up of a premise based on said operating condition change and a conclusion based on said control value such that if the premise be satisfied the conclusion be practiced, and said second means carries out the prediction by evaluating the satisfaction degree of premise and by selecting one of the fuzzy production rules.

14. A system according to claim 12, wherein said rules are based on an evaluation index which has been assigned a fuzzy set with a membership function and said second means carries out the prediction through fuzzy calculation by applying the actually detected vehicle operating condition to the fuzzy set.

15. A system according to claim 14, wherein said fuzzy calculation is carried out along a mini-max calculation.

16. A system according to claim 15, wherein said fuzzy calculation is carried out by finding a minimum value between the two fuzzy sets for each rule and then finding out one rule whose value is maximum.

17. A system according to claim 14, wherein said evaluation index is based on a feeling of a human being comprised of said vehicle operating condition.

18. A system according to claim 11, wherein said vehicle operating condition comprises of the vehicle speed and its nth difference.

19. A system according to any one of claims 11 to 18, wherein said control value is expressed by a fuzzy set with a membership function and is then converted into a real number in advance to be provided to said actuator means.

20. A system according to any one of claims 11 to 18, further including third means for carrying out a second fuzzy inference on the determined control command.

21. A system according to claim 20, wherein said third means carries out the second fuzzy inference on the basis of the detected operating condition and a fuzzy set with a membership function preassigned thereto.

22. A system according to any one of claims 11 to 18, wherein said control value is expressed by a real number.

23. A system according to claim 11, wherein said vehicle operating condition change has been expressed by an algebraic function.

24. A system according to claim 23, wherein a plurality of fuzzy production rules have been defined on the basis of the vehicle operating condition change which are made up of a premise based on said vehicle operating condition and a conclusion based on said control value such that if the premise be satisfied the conclusion be practiced, and said third means carries out the prediction by evaluating the satisfaction degree of premise and by selecting one of the rules.

25. A system according to claim 24, wherein said rules are based on an evaluation index preassigned a fuzzy set with a membership function and said third means carries out the prediction by making a fuzzy calculation between the fuzzy set and the algebraic function.

26. A system according to any one of claims 23 to 25, wherein said vehicle operating condition comprises of the vehicle speed and its n-th difference.

27. A method for vehicle autocruise control, comprising the steps of:
assigning a fuzzy set with a membership function to a vehicle parameter;
defining a plurality of fuzzy production rules on the basis of an analysis of judgments and feelings of an expert driver of a vehicle without autocruise control system with each fuzzy production rule being based on the fuzzy set and including a control value;
detecting operating condition of the vehicle through the vehicle parameter;
carrying out fuzzy inference on the vehicle parameter and the plurality of fuzzy production rules;
selecting one of the fuzzy production rules through the fuzzy inference; and
changing vehicle speed in accordance with the control value of the selected rule.

* * * * *